US012689965B2

(12) United States Patent
Sahin et al.

(10) Patent No.: US 12,689,965 B2
(45) Date of Patent: Jul. 21, 2026

(54) METHODS AND APPARATUS FOR SUPPORTING LOW LATENCY, LOW LOSS AND SCALABLE THROUGHPUT L4S THROUGH THE USE OF UE ROUTE SELECTION POLICY (URSP) RULES

(71) Applicant: Charter Communications Operating, LLC, St. Louis, MO (US)

(72) Inventors: Yildirim Sahin, Englewood, CO (US); Paul L. Russell, Jr., Lawrence, NJ (US); Maulik Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 224 days.

(21) Appl. No.: 18/199,907

(22) Filed: May 19, 2023

(65) Prior Publication Data

US 2024/0388989 A1     Nov. 21, 2024

(51) Int. Cl.
*H04L 45/30*          (2022.01)
*H04W 40/02*          (2009.01)

(52) U.S. Cl.
CPC ............. *H04W 40/02* (2013.01); *H04L 45/30* (2013.01)

(58) Field of Classification Search
None
See application file for complete search history.

(56) References Cited

U.S. PATENT DOCUMENTS 12,413,653 B1     9/2025   Yi
2002/0150060 A1   10/2002   Montpetit 2024/0056401 A1 *   2/2024   Nádas ..................... H04L 47/36
2024/0236765 A1     7/2024   Xu et al.
2024/0334243 A1    10/2024   Taneja
2024/0373448 A1 *  11/2024   Fang ....................... H04L 47/11

(Continued)

FOREIGN PATENT DOCUMENTS

EP          4391639 A1     6/2024
WO     2023/046118 A1     3/2023
WO     2024013545 A1     1/2024

OTHER PUBLICATIONS

Change Request, Resolution of EN for L4S, SA WG2 Meeting #156e, S2-2306189, E-meeting, Apr. 17, 2023-Apr. 21, 2023, 4 pages.

(Continued)

*Primary Examiner* — Minh Trang T Nguyen
(74) *Attorney, Agent, or Firm* — Straub & Straub; Michael P. Straub; Stephen T. Straub

(57)     ABSTRACT

A UE is supplied with one or more UE Route Selection Policy (URSP) rules which include an indicator indicating support for a "L4S" Connection Capability. The use of an L4S connection capability indicator allows a UE to obtain L4S support for application traffic data requiring L4S support. The connection capabilities option in the URSP rule or rules allows a UE to select an appropriate route selection for matching L4S connection capability. By allowing a UE to indicate that a packet or packet flow is to be matched to a PDU session which has an L4S connection capability, the UE can trigger establishment of a new PDU session to support a flow of application data packets requiring L4S support or can cause the packet flow to be assigned to an existing PDU session or trigger a modification of an existing PDU Session which supports L4S.

20 Claims, 14 Drawing Sheets

(56) References Cited

U.S. PATENT DOCUMENTS

| | | |
|---|---|---|
| 2025/0016883 A1 | 1/2025 | Yang et al. |
| 2025/0126064 A1 | 4/2025 | Ke |
| 2025/0168072 A1* | 5/2025 | Karampatsis ....... H04L 41/0894 |

OTHER PUBLICATIONS

Change Request, Standardized traffic categories in URSP, 3GPP TSG-CT WG1 Meeting #141e, C1-232295, Online Apr. 17-21, 2023, 15 pages.

Notification of Transmittal of the International Search Report and the Written Opinion of the International Searching Authority, International Search Report and Written Opinion of the International Searching Authority from PCT/US2024/029654, dated Sep. 16, 2024, 17 pages.

Iyengar et al., RFC 9000, QUIC: A UDP-Based Multiplexed and Secure Transport, Internet Engineering Task Force (IETF), May 2021, 151 pages.

Briscoe et al., RFC 9330, Low Latency, Low Loss, and Scalable Throughput (L4S) Internet Service: Architecture, Internet Engineering Task Force (IETF), Jan. 2023, 36 pages.

De Schepper et al., RFC 9331, The Explicit Congestion Notification (ECN) Protocol for Low Latency, Low Loss, and Scalable Throughput (L4S), Internet Engineering Task Force (IETF), Jan. 2023, 52 pages.

De Schepper et al., RFC 9332, Dual-Queue Coupled Active Queue Management (AQM) for Low Latency, Low Loss, and Scalable Throughput (L4S), Internet Engineering Task Force (IETF), Jan. 2023, 52 pages.

Ramakrishnan et al., Request for Comments: 3168, The Addition of Explicit Congestion Notification (ECN) to IP, Network Working Group, Sep. 2001, 63 pages.

Kohler et al., Request for Comments: 4340, Datagram Congestion Control Protocol (DCCP), Network Working Group, Mar. 2006, 129 pages.

Randall R. Stewart, Request for Comments: 4960, Stream Control Transmission Protocol, Network Working Group, Sep. 2007, 96 pages, downloaded from https://www.rfc-editor.org/rfc/rfc4960.txt.

Sarker et al., Request for Comments: 8888, RTP Control Protocol (RTCP) Feedback for Congestion Control, Internet Engineering Task Force (IETF), Jan. 2021, 9 pages, downloaded from https://www.rfc-editor.org/rfc/rfc8888.txt.

Briscoe et al., More Accurate ECN Feedback in TCP, Workgroup: TCP Maintenance & Minor Extensions (tcpm), Internet-Draft: draft-ietf-tcpm-accurate-ecn-22, Updates: 3168 (if approved), Intended Status: Standards Track dated Nov. 9, 2022, 51 pages.

Change Request, Connection capabilities defined in GSMA PRD NG. 135, 3GPP TSG-CT WG1 Meeting #140, C1-230083, Athens, Greece, Feb. 27-Mar. 3, 2023, 13 pages.

Change Request, Standardized traffic categories in URSP, 3GPP TSG-CT WG1 Meeting #140, C1-230314, Athens, Greece, Feb. 27-Mar. 3, 2023, 15 pages.

LS reply on Traffic Categories, ENSWI#20 Doc 004, 3GPP TSG-CT WG1 Meeting #140, C1-230713, Athens, Greece, Feb. 27-Mar. 3, 2023, 4 pages.

Third Generation Partnership Project (3GPPTM), Draft Meeting Report for TSG CT WGT meeting: 140, Athens, Geneva, Feb. 27, 2023 to Mar. 3, 2023, 365 pages.

3rd Generation Partnership Project; Technical Specification Group Core Network and Terminals; Numbering, addressing and identification; (Release 18), 3GPP TS 23.003 V18.1.0, Mar. 2023, 152 pages.

3rd Generation Partnership Project; Technical Specification Group Services and System Aspects; System architecture for the 5G System (5GS); Stage 2 (Release 18), 3GPP TS 23.501 V18.1.0, Mar. 2023, 667 pages.

3rd Generation Partnership Project; Technical Specification Group Services and System Aspects; Procedures for the 5G System (5GS); Stage 2 (Release 18), 3GPP TS 23.502 V18.1.1 Apr. 2023, 829 pages.

3rd Generation Partnership Project; Technical Specification Group Services and System Aspects; Policy and charging control framework for the 5G System (5GS); Stage 2 (Release 18), 3GPP TS 23.503 V18.1.0, Mar. 2023, 165 pages.

3rd Generation Partnership Project; Technical Specification Group Core Network and Terminals; Non-Access-Stratum (NAS) protocol for 5G System (5GS); Stage 3; (Release 18), 3GPP TS 24.501 V18.2.1, Mar. 2023, 1057 pages.

3rd Generation Partnership Project; Technical Specification Group Core Network and Terminals; User Equipment (UE) policies for 5G System (5GS); Stage 3 (Release 18), 3GPP TS 24.526 V18.0.0, Sep. 2022, 59 pages.

3rd Generation Partnership Project; Technical Specification Group Core Network and Terminals; User Equipment (UE) policies for 5G System (5GS); Stage 3, (Release 18), 3GPP TS 24.526 V18.2.0, Mar. 2023, 64 pages.

3rd Generation Partnership Project; Technical Specification Group Radio Access Network; NR; NR and NG-RAN Overall Description; Stage 2 (Release 17), 3GPP TS 38.300 V17.4.0, Mar. 2023, 210 pages.

3rd Generation Partnership Project; Technical Specification Group Radio Access Network; NG-RAN; PDU Session User Plane Protocol (Release 17), 3GPP TS 38.415 V17.0.0, Apr. 2022, 18 pages.

LTE; 5G; Interface between the Control Plane and the User Plane nodes (3GPP TS 29.244 version 16.5.0 Release 16) ETSI TS 129 244, V16.5.0, Nov. 2020, 317 pages.

* cited by examiner

METHODS AND APPARATUS FOR SUPPORTING LOW LATENCY, LOW LOSS AND SCALABLE THROUGHPUT L4S THROUGH THE USE OF UE ROUTE SELECTION POLICY (URSP) RULES

FIELD

The present application relates to communications and, more particularly, to methods and apparatus for supporting Low Latency, Low Loss and Scalable Throughput (L4S) communications including L4S packet flows, e.g., through the use of UE Route Selection Policy (URSP) rules.

BACKGROUND

The 5G System (5GS) architecture is designed to support a wide variety of services, including media services. 3GPP Rel-18 completed a study item related to support of advanced media services, e.g., High Data Rate Low Latency (HDRLL) services, AR/VR/XR services and tactile/multi-modality communication services. One objective of this study was to provide enhancements of network work exposure to support interaction between 5GS and applications.

Support for Explicit Congestion Notification (ECN), which allows for end-to-end notification of network congestion for L4S is discussed in TS 23.501 V18.1.0 (March 2023) which is hereby expressly incorporated by reference in its entirety. Clause 5.37.3 of this reference, TS 23.501 explains that in a 5G System, ECN marking for L4S may be supported. ECN marking for L4S is enabled on a per QoS Flow basis in the uplink and/or downlink direction. In 5G systems, a QoS flow may be enabled with ECN marking for L4S requirement e.g. statically when a PDU session is established based on configuration in SMF or PCF, or dynamically based on detection of the L4S traffic e.g. via ECT(1) and/or IP 5 tuple in the IP header whereby SMF or PCF triggers a setup of a QoS Flow enabled for L4S, or by requests by an AF.

5G systems support some GSM Association (commonly referred to as 'the GSMA' or Global System for Mobile Communications, originally Groupe Spécial Mobile) traffic categories. GMSA is a non-profit industry organization that represents the interests of mobile network operators worldwide. While GSMA has defined several traffic categories, L4S isn't reflected or among the already defined traffic categories.

While ECN marking and L4S traffic is contemplated in 5G, the standards do not currently define a method or process which a UE can use to initiate or request a traffic flow that is to receive L4S treatment is not currently defined in 5G standards. Furthermore, a traffic category marking which might be used to indicate such traffic and/or request flows for such traffic does not currently exist.

In view of the above it should be appreciated that there is a need for methods and/or apparatus for allowing an application operating on a UE to initiate or obtain use of an existing L4S traffic flow for application data packets which are to receive such service.

SUMMARY

In accordance with the invention a UE is supplied with one or more URSP rules which include an indicator which indicates support for a "L4S" Connection Capability. The use of an L4S connection capability indicator allows a UE to obtain L4S support for application traffic data requiring L4S support.

In some embodiment the UE is provisioned in accordance with the invention by a Policy Control Function (PCF) with UE Policies (e.g., UE Route Selection Policy (URSP) rules and/or Access network discovery and selection policy (ANDSP) rules) which take into consideration an L4S connection capability indicator which indicates that L4S is to be supported by a connection or packet flow being requested or initiated by an application or to communicate a data packet flow which is intended to be an L4S flow.

The configuration of the UE may be and sometimes is performed in accordance with 3GPP TS 23.502 V18.1.1 (2023 April) clause 4.2.4.3 which is hereby incorporated by reference in its entirety, and which defines a UE Configuration Update Procedure which can be used to update UE policy information including policy rules.

A URSP Rule or rules stored in the UE in accordance with the invention are enhanced with a new "L4S" Connection Capabilities value. These Enhanced URSP Rules can be pre-configured in the UE or dynamically provisioned by the PCF. The Connection Capabilities option in the URSP rule or rules allows a UE to select an appropriate route selection for matching L4S connection capability.

By allowing a UE to indicate that a packet or packet flow is to be matched to a PDU session which has an L4S connection capability; the UE can trigger establishment of a new PDU session to support a flow of application data packets requiring L4S support or can cause the packet flow to be assigned to an existing PDU session or trigger a modification of an existing PDU Session which supports L4S. In various embodiments a UE compares URSP Rules to the connection capability, traffic type, indicated in a request or determined based on the content of an application packet to be communicated in a data flow: By including an L4S indicator value in a request or determining that a packet is to receive L4S service, the UE can match the packet to a URSP Rule including a corresponding L4S connection capability indicator and either associate the data packet and/or packet flow to an established PDU Session which supports L4S data traffic or will trigger the establishment of a new PDU Session which supports L4S traffic. In one particular exemplary embodiment, for "connection capabilities" type in a PDU session establishment request and/or URSP Rule, the traffic descriptor component value field is encoded as a sequence of one octet for number of network capabilities followed by one or more octets, each containing a connection capability identifier with the L4S connection capability identifier of the present invention being encoded as bits: 0 1 0 0 0 0 0 0 to indicate an L4S connection capability: The value is representative and depending on the embodiment another predetermined value may be used to specify, identify, or indicate that an L4S connection capability is to be supported, used or provided for a traffic flow: The encoded bits or value used to indicate an L4S connection capability can be and sometimes is referred to herein as an L4S traffic descriptor since it can be used to indicate a connection that is to support L4S traffic.

One exemplary embodiment is directed to a method of operating User Equipment (UE), where the method comprises: storing in the UE (e.g., in memory) a set of UE Route Selection Policy (URSP) rules, said set of URSP rules including at least a first rule including a L4S traffic descriptor (e.g. the first rule including a traffic descriptor which includes a connection capability identifier indicating "L4S"): detecting a need to support a L4S traffic flow by detecting i) an application request (e.g., an API message generated by an application, e.g., a first application, running on the UE (e.g., a local application)) requesting L4S treatment for application traffic corresponding to the requesting application or ii) an L4S indicator in incoming application traffic (e.g., in an IP header of an incoming application traffic packet); and determining the URSP rule stored in the UE to use in response to detecting the need to support the L4S traffic flow; said determining including identifying a stored URSP rule that includes an L4S traffic descriptor.

Depending on the embodiment, based on the determined URSP rule to use which corresponds to an L4S traffic descriptor and thus L4S connection capability, the UE will initiate a new PDU session which supports L4S traffic and assign the application packet flow requiring L4S connection capability to the new PDU session or assign the application packet flow to an existing PDU session or trigger a modification of an existing PDU Session which satisfies the determined URSP rule which is being used, e.g., a PDU session which supports the L4S connection capabilities of the application packet flow.

By allowing for an indication of an L4S connection capability through the new L4S connection capability indicator which can be encoded or indicated using a predetermined value, e.g., a valued used to indicate L4S or an L4S traffic type, a UE can request that a packet flow requiring L4S capability be assigned to a PDU session or that a new PDU session with L4S capability be created.

Numerous additional details and variations on the above-described methods and embodiments are discussed in the detailed description which follows, and it should be appreciated that not all embodiments need include all of the features discussed above in the summary.

4 corresponding to an application, using a stored URSP rule including a LS4 traffic descriptor, and associating the new traffic flow with an existing ongoing PDU session, which supports L4S, or triggering the establishment of a new PDU session which supports L4S, in accordance with an exemplary embodiment.

Figure 6A:
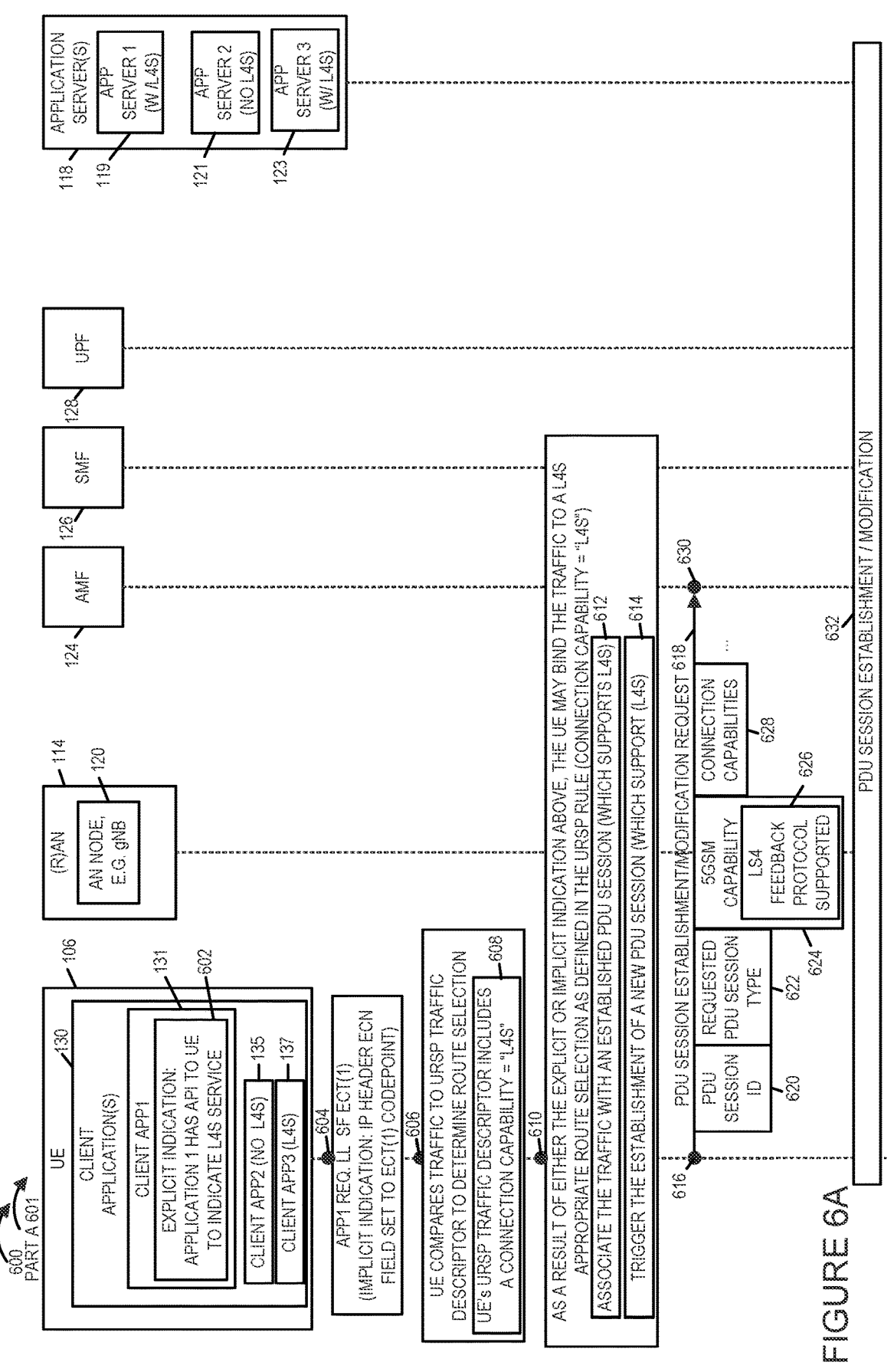
FIG. 6A is first part of a signaling diagram illustrating a UE: detecting a need to support a new LS4 traffic flow corresponding to an application, using a stored URSP rule including a LS4 traffic descriptor, and associating the new traffic flow with an existing ongoing PDU session, which supports L4S, or triggering the establishment of a new PDU session, which supports L4S, in accordance with an exemplary embodiment.
Figure 6B:
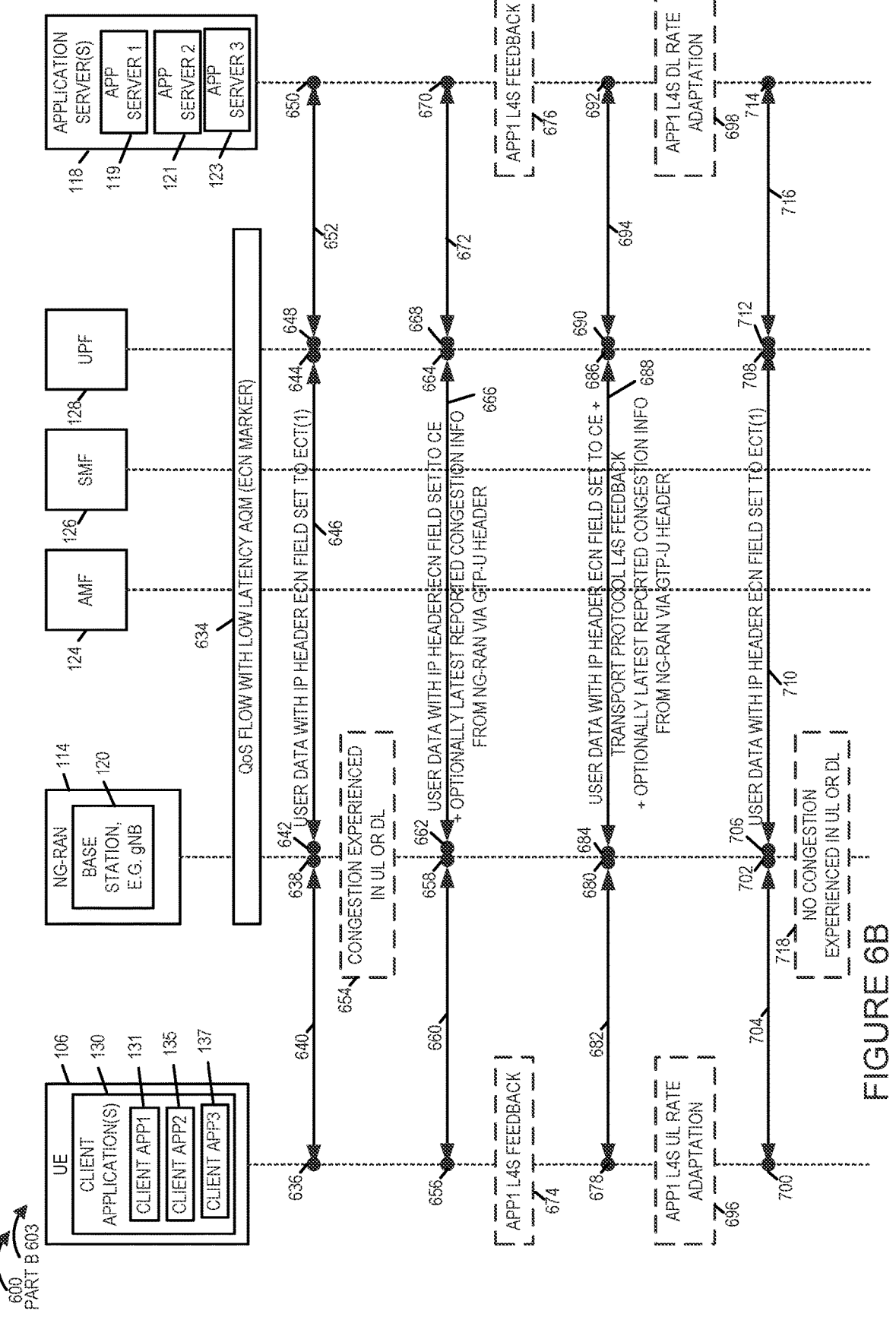
FIG. 6B is second part of a signaling diagram illustrating a UE: detecting a need to support a new LS4 traffic flow

FIG. 6 comprises the combination of FIG. 6A and FIG. 6B.

Figure 7A:
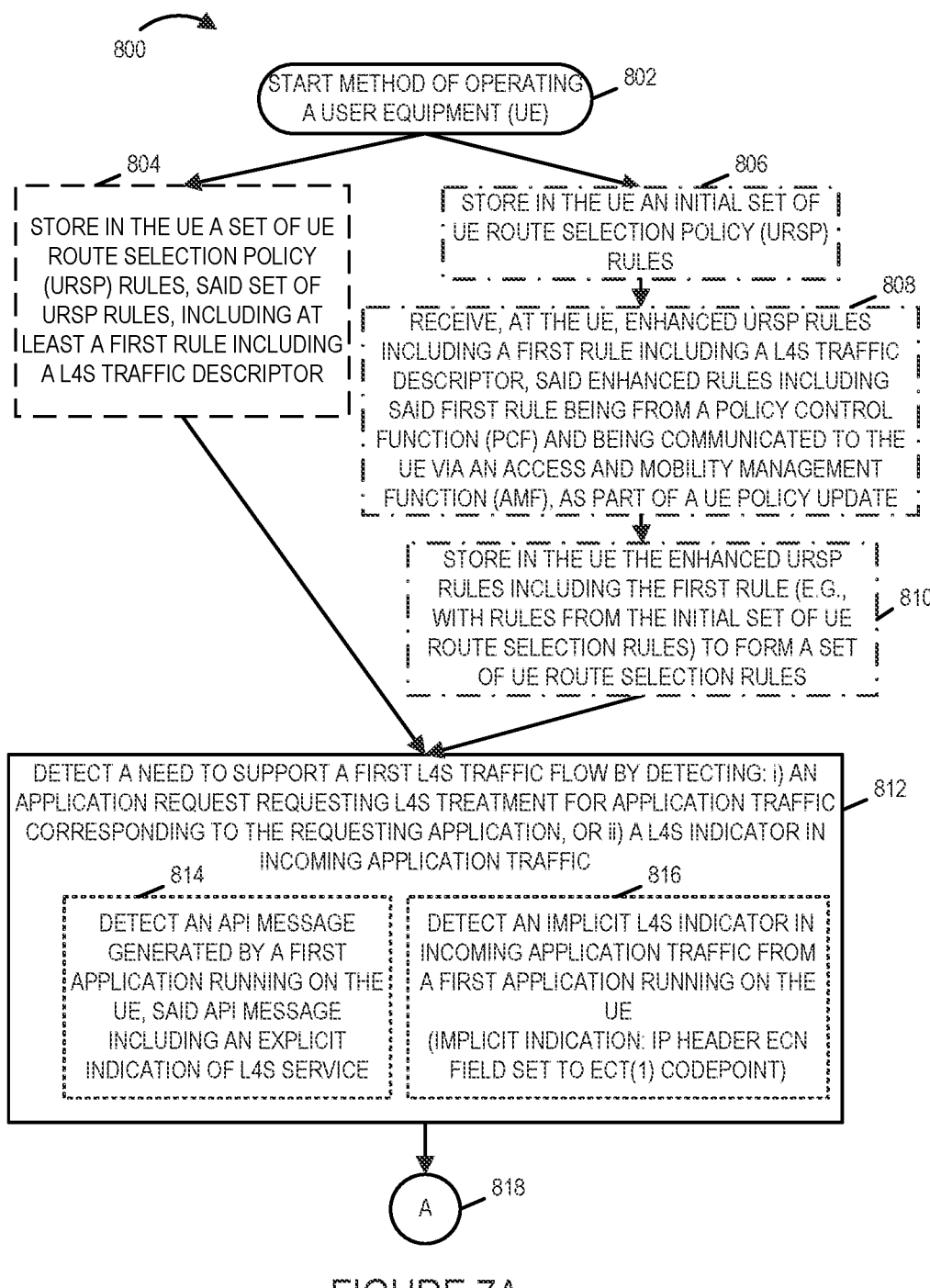

FIG. 7A is a first part of a flowchart of an exemplary method of operating a UE in accordance with an exemplary embodiment, said exemplary method including identifying and using a stored URSP rule which includes an L4S traffic descriptor, in accordance with an exemplary embodiment.

Figures 7, 7A, 7B:
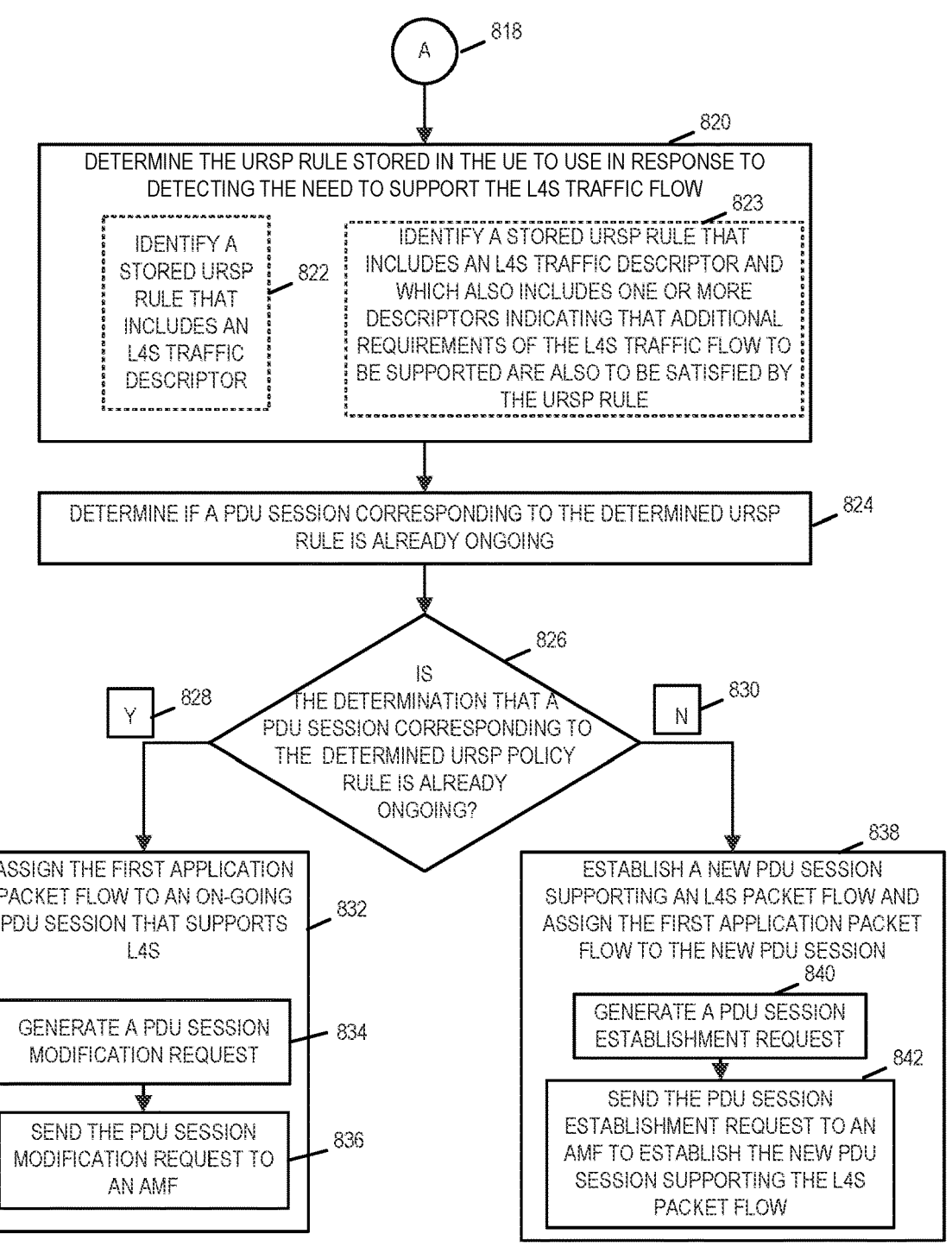

FIG. 7B is a second part of a flowchart of an exemplary method of operating a UE in accordance with an exemplary embodiment, said exemplary method including identifying and using a stored URSP rule which includes an L4S traffic descriptor, in accordance with an exemplary embodiment.

FIG. 7 comprises the combination of FIG. 7A and FIG. 7B.

Figure 8:
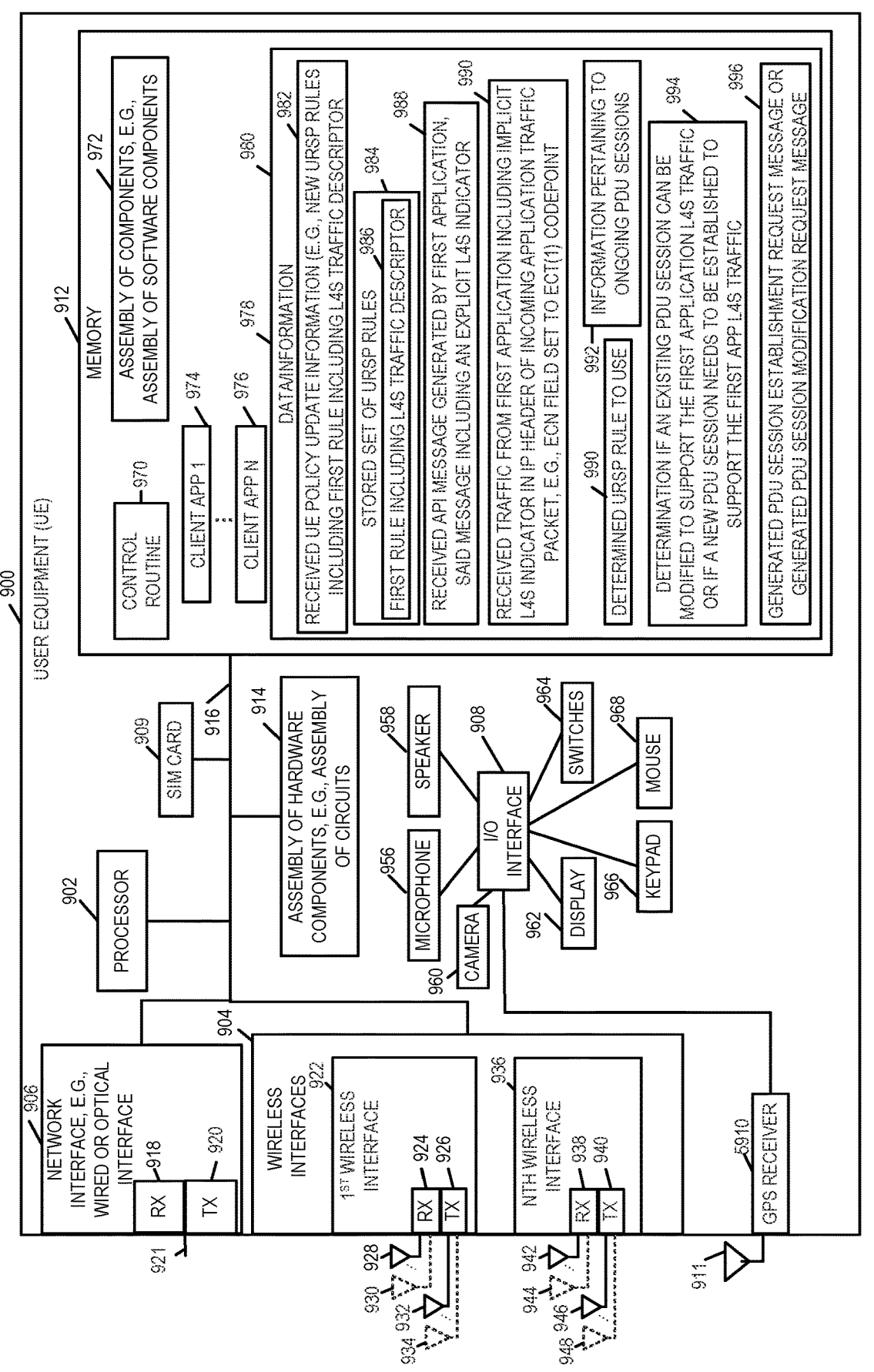

FIG. 8 is a drawing of an exemplary user equipment (UE) in accordance with an exemplary embodiment.

Figure 9:
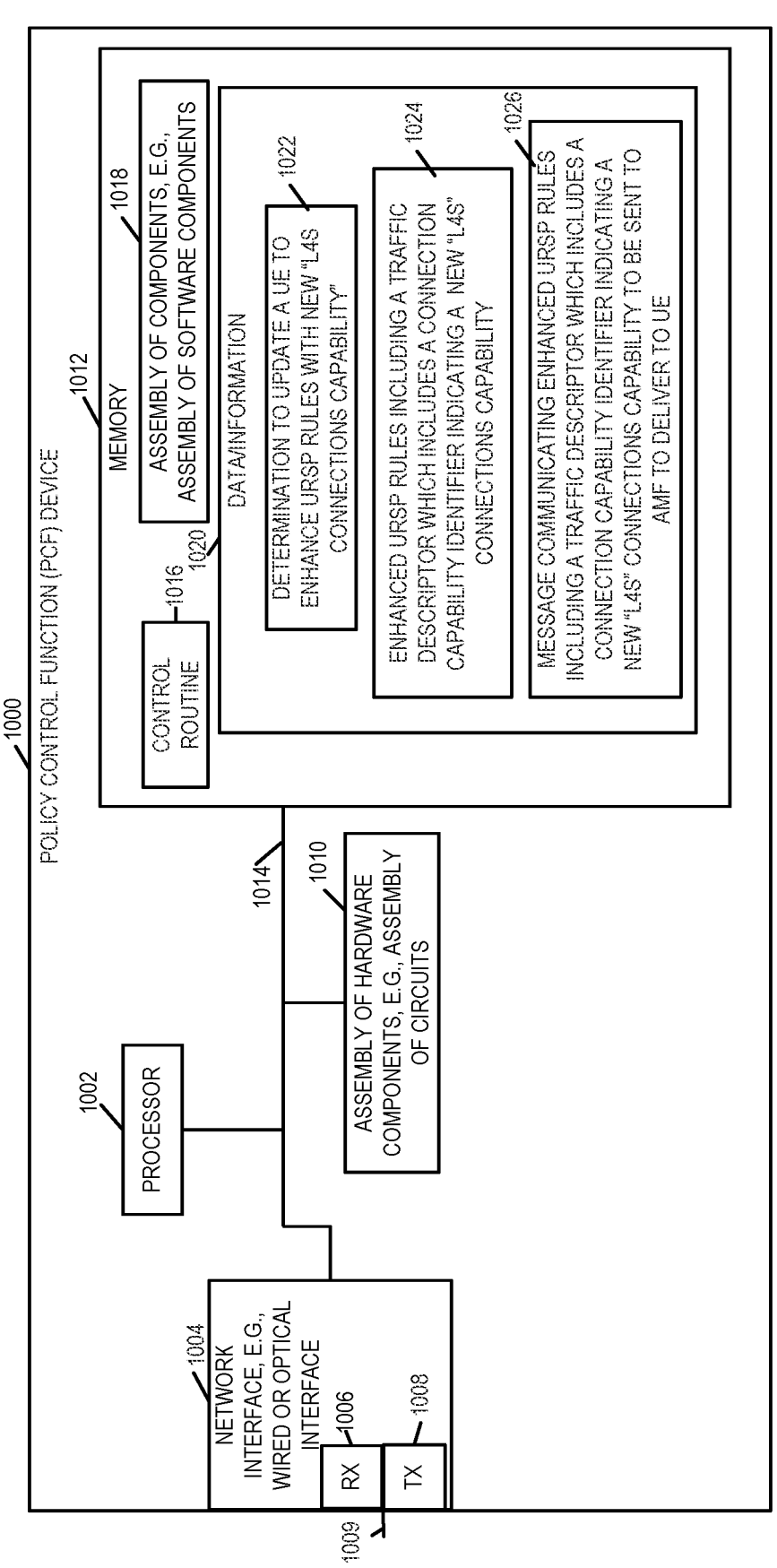

FIG. 9 is a drawing of an exemplary policy control function (PCF) device in accordance with an exemplary embodiment.

Figure 10:
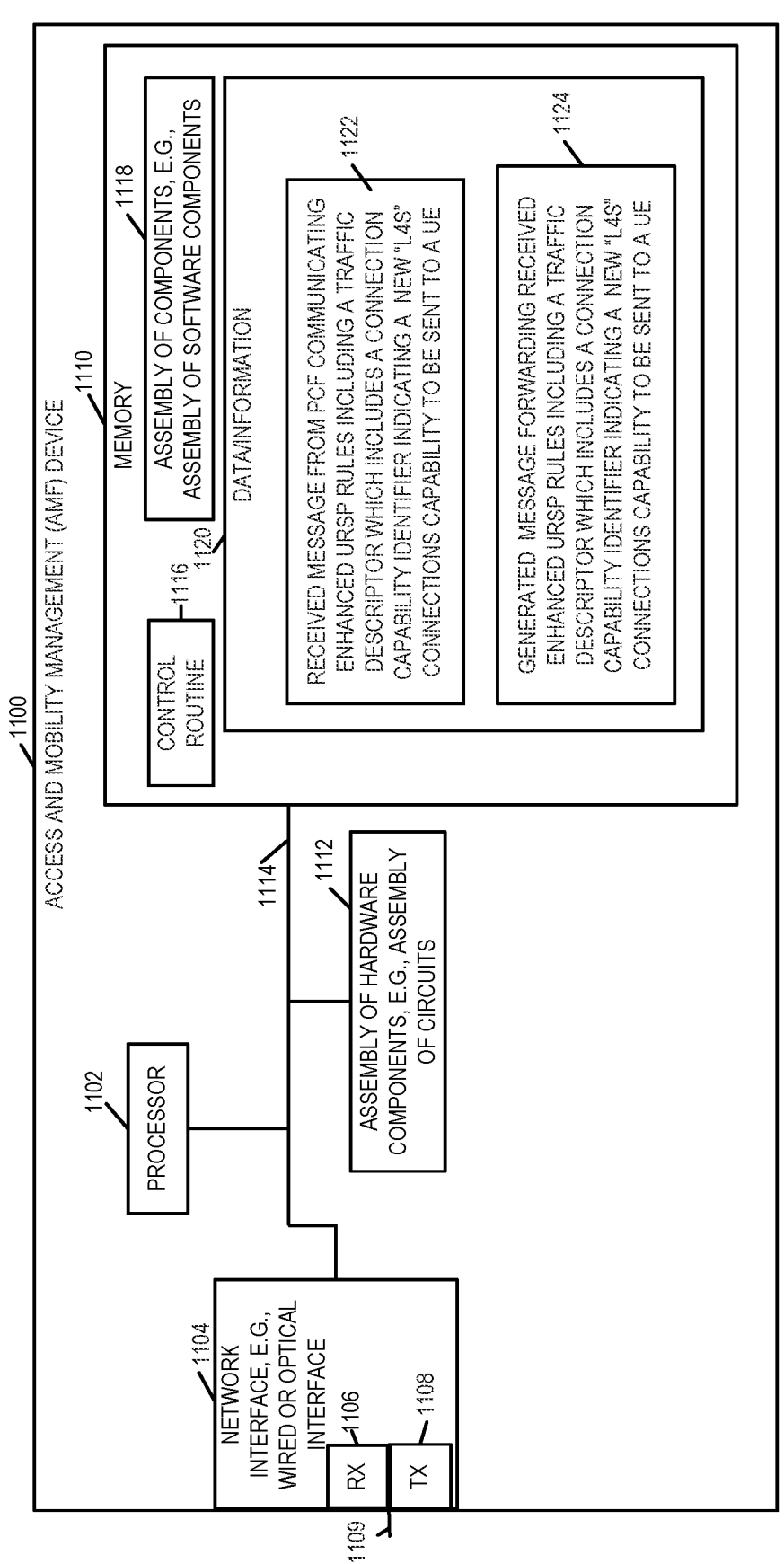

FIG. 10 is a drawing of an exemplary access and mobility management function (AMF) device in accordance with an exemplary embodiment.

Figure 11:
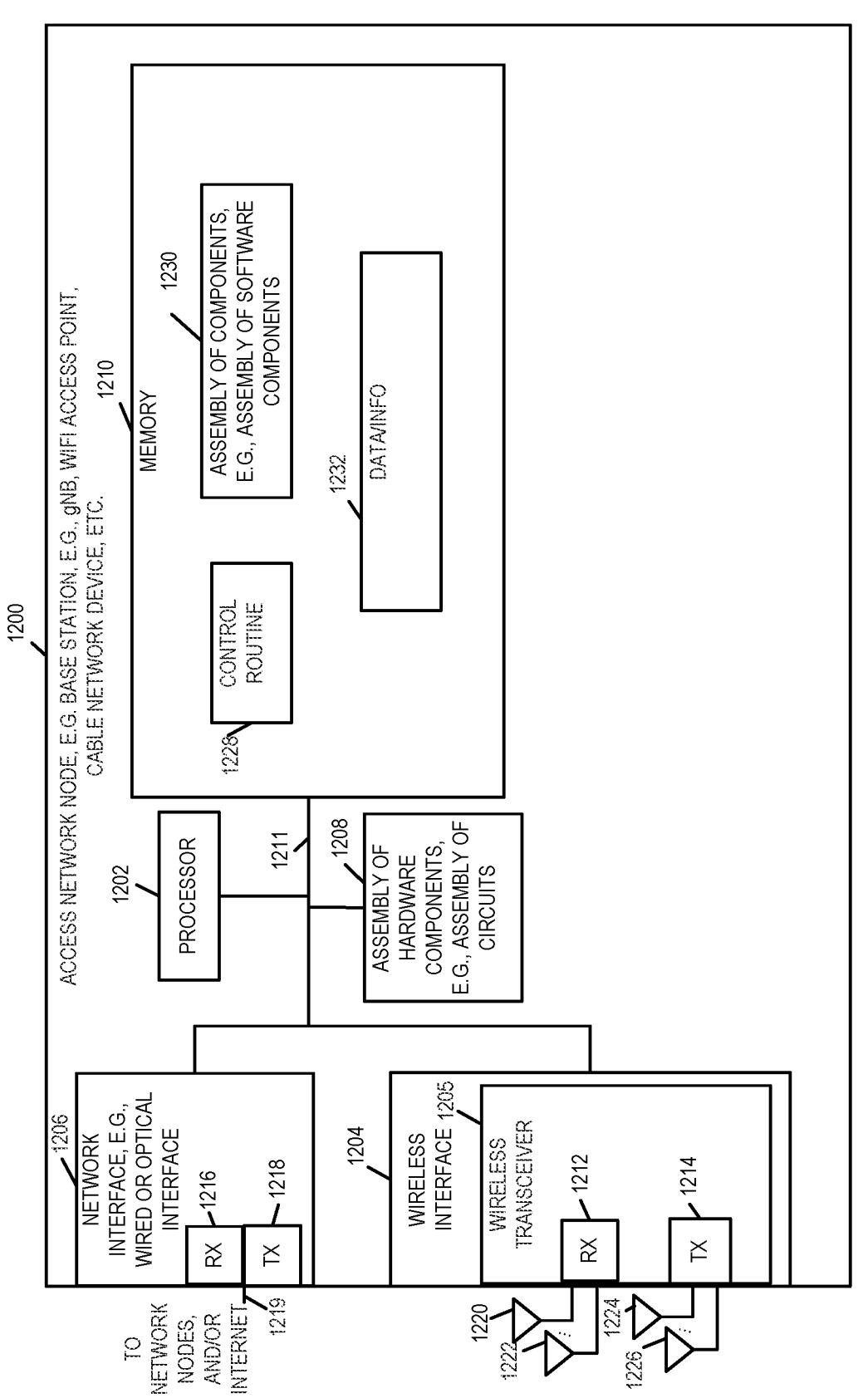

FIG. 11 is a drawing of an exemplary access network node in accordance with an exemplary embodiment.

DETAILED DESCRIPTION

Figure 1:
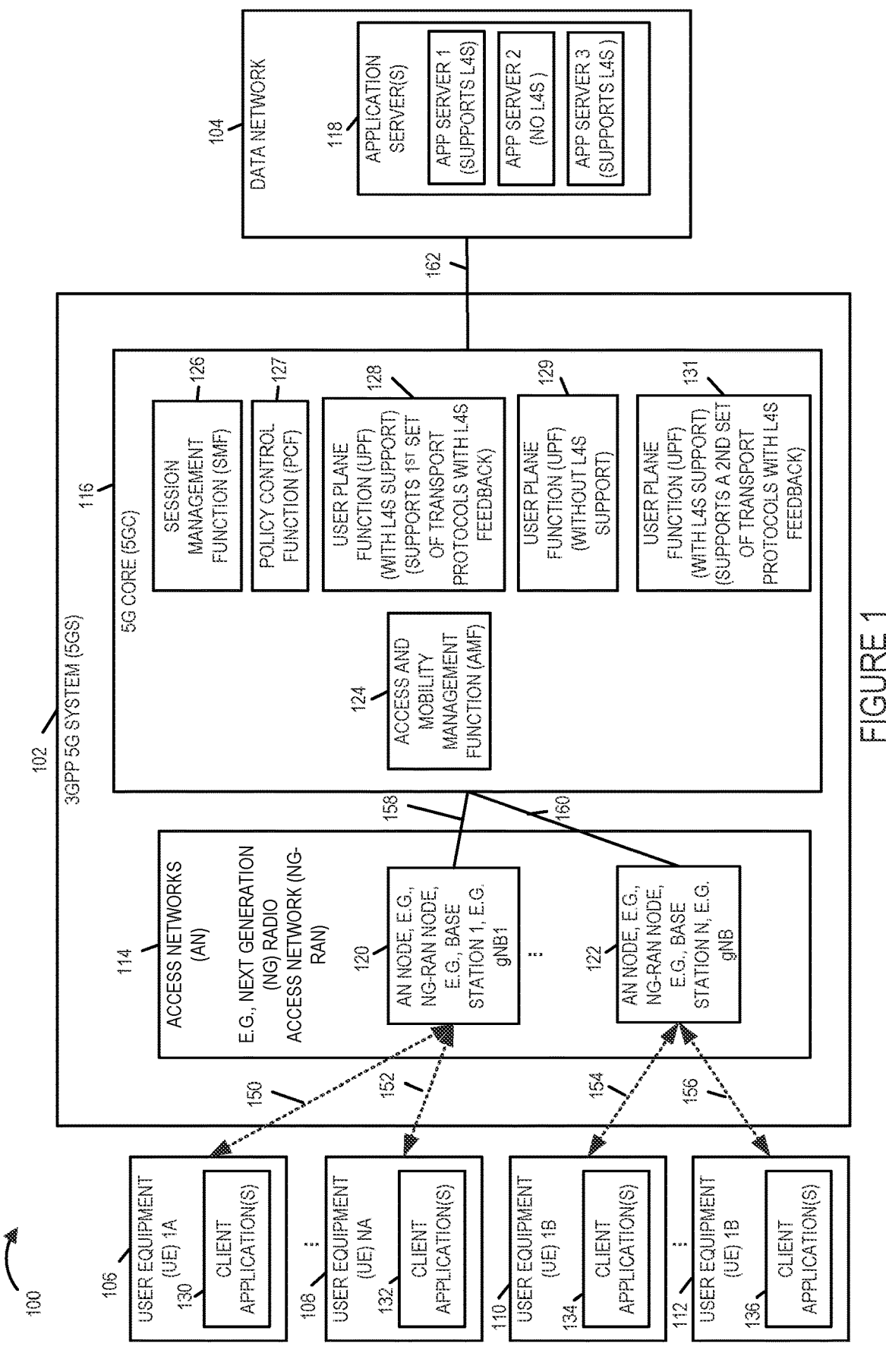
FIG. 1 is a drawing of an exemplary communications system in accordance with an exemplary embodiment.

FIG. 1 is a drawing of an exemplary communications system 100 in accordance with an exemplary embodiment. While the exemplary embodiments show an example using a 3GPP 5G system, the invention is not limited to such systems and the messages of the invention can be used in wired access systems and with non-3GPP ANs (access networks). Thus, it should be appreciated that the invention and messages can be used with NG-RAN and non-3GPP RAN where the non-3GPP AN can be any of the following: untrusted, trusted, or wireline access network depending on the embodiment in which the invention is used.

Exemplary communications system 100 includes a 3GPP 5G system (5GS) 102, a data network 104 and a plurality of user equipments (UEs) (UE1A 106, . . . , UE NA 108, UE1B 110, . . . , UENB 112) coupled together as shown. The 3GPP 5G system 102 includes an access network (AN), e.g., a next generation (NG) radio access network (NG-RAN) 114 coupled 5G core (5GC) 116 as shown. NG-RAN 114 includes a plurality of ANs, e.g., NG-RAN nodes (NG-RAN node 1 120, e.g., base station 1, e.g., gNB1, . . . , NG-RAN node N 122, e.g., base station N 122, e.g., gNB N). The 5G core 116 includes an access and mobility management function (AMF) 124, a session management function (SMF) 126, a policy control function (PCF) 127, a user plane function (UPF) 128 with L4S support (supports a 1st set of transport protocols with L4S feedback), a UPF 129 without L4S support, and a UPF 131 with L4S support (supports a 2nd set of transport protocols with L4S feedback), which may be coupled together. The data network 104 includes application server(s) 118. Applications servers 118 includes application server 119, which supports L4S, application server 2 121, without L4S support, and application server 3 123, which supports L4S. Each UE includes client applications. Some of the applications may require L4S capability. UE1A 106 includes client application(s) 130. UENA 108 includes client application(s) 132. UE1B 110 includes client application(s) 134. UENB 112 includes client application(s) 136.

UE 1106 is coupled to NG-RAN node 1 120 via wireless communications link 150. UE NA 108 is coupled to NG-RAN node 1 120 via wireless communications link 150. NG-RAN node 1 120 is coupled to the 5G core 116 via communications link 152. UE 1B 110 is coupled to NG-RAN node N 122 via wireless communications link 154. UE NB 108 is coupled to NG-RAN node N 122 via wireless communications link 156. NG-RAN node N 122 is coupled to the 5G core 116 via communications link 160. 5G core 116 is coupled to data network 104 via communications link 162.

In accordance with a feature of various embodiments of the present invention, a UE, e.g., UE1A 106, may, and sometimes does includes one or more stored URSP rules including an L4S traffic descriptor (e.g., included as a connection capability="L4S", which is used in determining routing with regard to a requested L4S traffic flow (e.g., an L4S application packet flow) from a client application of the UE. The L4S application packet flow is assigned (if possible) to an existing established ongoing PDU session that supports L4S and satisfies the URSP rule, or a new PDU session is established to support the requested L4S flow from the application. Thus, the UE generates and sends a PDU session modification request or a PDU session establishment request message to an AMF.

The term L4S Feedback (used in 3GPP specifications) and ECN Feedback (used in IETF specifications) in the context of this application are interchangeable.

Figure 2:
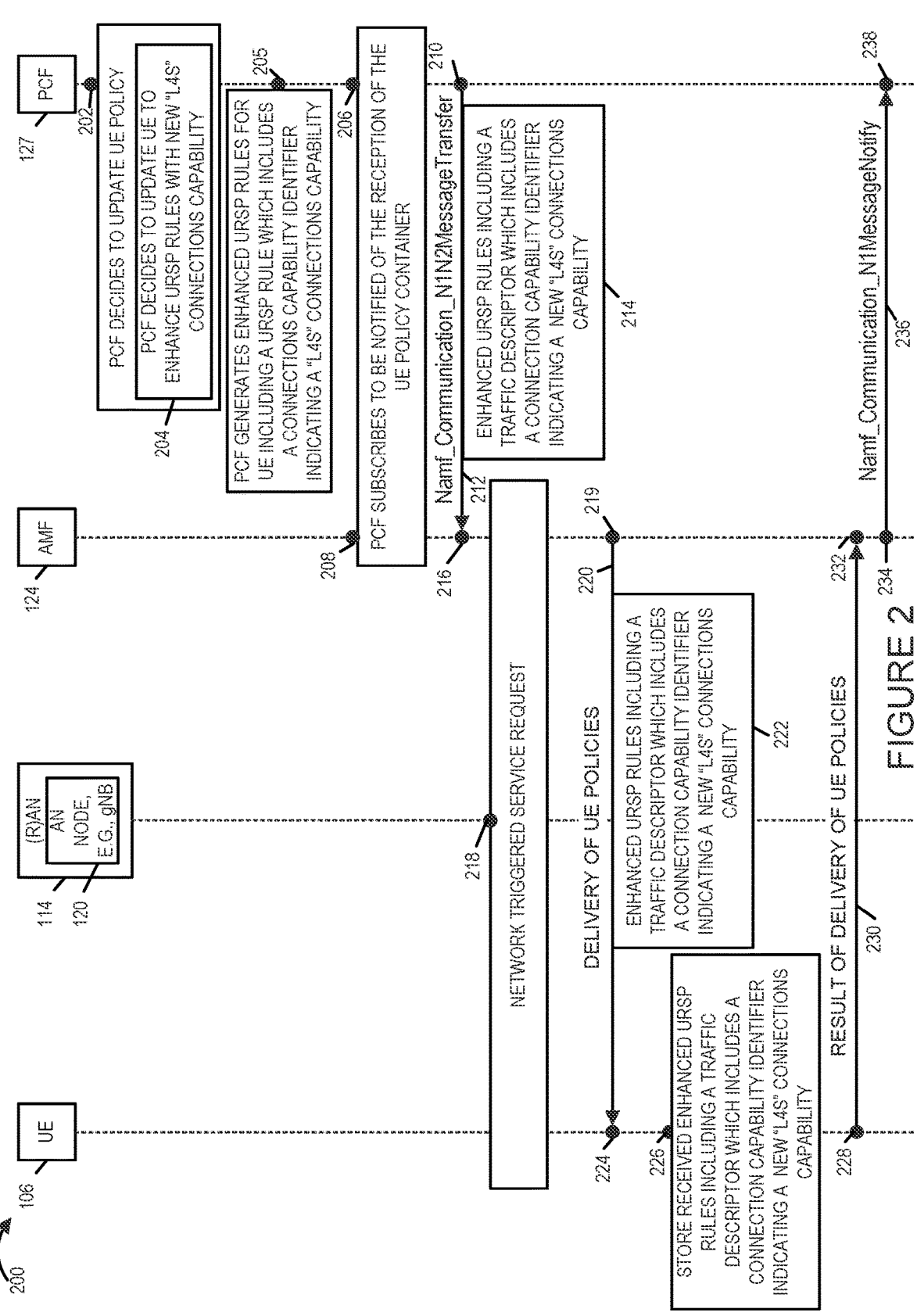
FIG. 2 is a signaling diagram illustrating an exemplary method, in accordance with an exemplary embodiment, of updating URSP policy rules in a user equipment (UE) with enhanced rules including a traffic descriptor which includes a connection capability identifier indicating a new "L4S" connections capability.

FIG. 2 is a signaling diagram 2000 illustrating an exemplary method, in accordance with an exemplary embodiment, of updating URSP policy rules in a user equipment (UE) with enhanced rules including a traffic descriptor which includes a connection capability identifier indicating a new "L4S" connections capability. The exemplary method of signaling diagram 2000 is implemented, e.g., by elements, e.g., UE 106, gNB 120, AMF 124, and PCF 127, of system 100 of FIG. 1.

In step 202 PCF 127 decides to update UE policy for UE 106. Step 202 includes step 204, in which the PCF decides to update UE 106 to enhance URSP rules with new "L4S" connection capability. In step 205 the PCF 127 generates enhanced URSP rules including a URSP rule which includes a connection capability identifier indicating a L4S connection capability. In step 206 the PCF subscribes to be notified of the reception of the UE policy container. In step 208, the AMF 208 recognizes that the PCF has subscribed to be notified of the UE policy container.

In step 210 the PCF generates and sends Namf_Communication_N1N2Message Transfer 212, which communicates enhanced URSP rules which includes a traffic descriptor which includes a connection capability identifier indicating a new "L4S" connections capability 214. In step 216, the AMF receives the Namf_Communication_N1N2Message Transfer 212, conveying the enhanced URSP rules which includes a traffic descriptor which includes a connection capability identifier indicating a new "L4S" connections capability 214.

In step 218 a network triggered service request is detected. In response to the network triggered service request, in step 219 the AMF 124 generates and sends signals 220 to UE 106. Signals 220 deliver UE polices to the UE 106. The delivered polices include the enhanced URSP rules which includes a traffic descriptor which includes a connection capability identifier indicating a new "L4S" connections capability 222 (which is forwarded information 214). In step 224, UE 106 receives signals 220 and recovers the communicated information. In step 226 UE 106 stores the received enhanced URSP rules which includes a traffic descriptor which includes a connection capability identifier indicating a new "L4S" connections capability. Thus, the PCF has communicated the enhanced URSP rules with the new "L4S" connections capability to the UE 106, via AMF 124.

In step 228, UE 106, generates and sends message 230 indicating the result of the delivery of the UE policy, e.g., successful delivery. Message 230 is received by AMF 124, in step 232. In response to the received message 230, in step 234 the AMF generates and sends Namf_Communication_N1MessaageNotify 236, e.g., indicating that the updated UE policy rules communicated in message transfer 214 have been delivered, and stored in the UE 106, as part of UE policy update.

Figure 3:
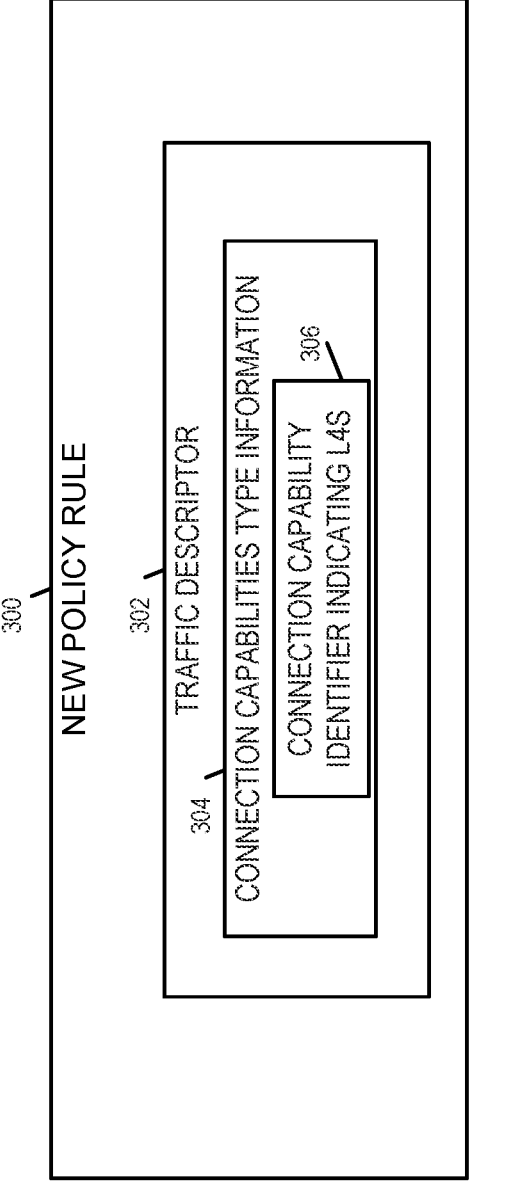
FIG. 3 illustrates an exemplary new policy rule including a traffic descriptor including connection capabilities type information includes a connection capability identifier indicating L4S in accordance with an exemplary embodiment.

FIG. 3 illustrates an exemplary new policy rule 300 including a traffic descriptor 302 including connection capabilities type information 304, which includes a connection capability identifier indicating L4S 306, in accordance with an exemplary embodiment.

Figure 4:
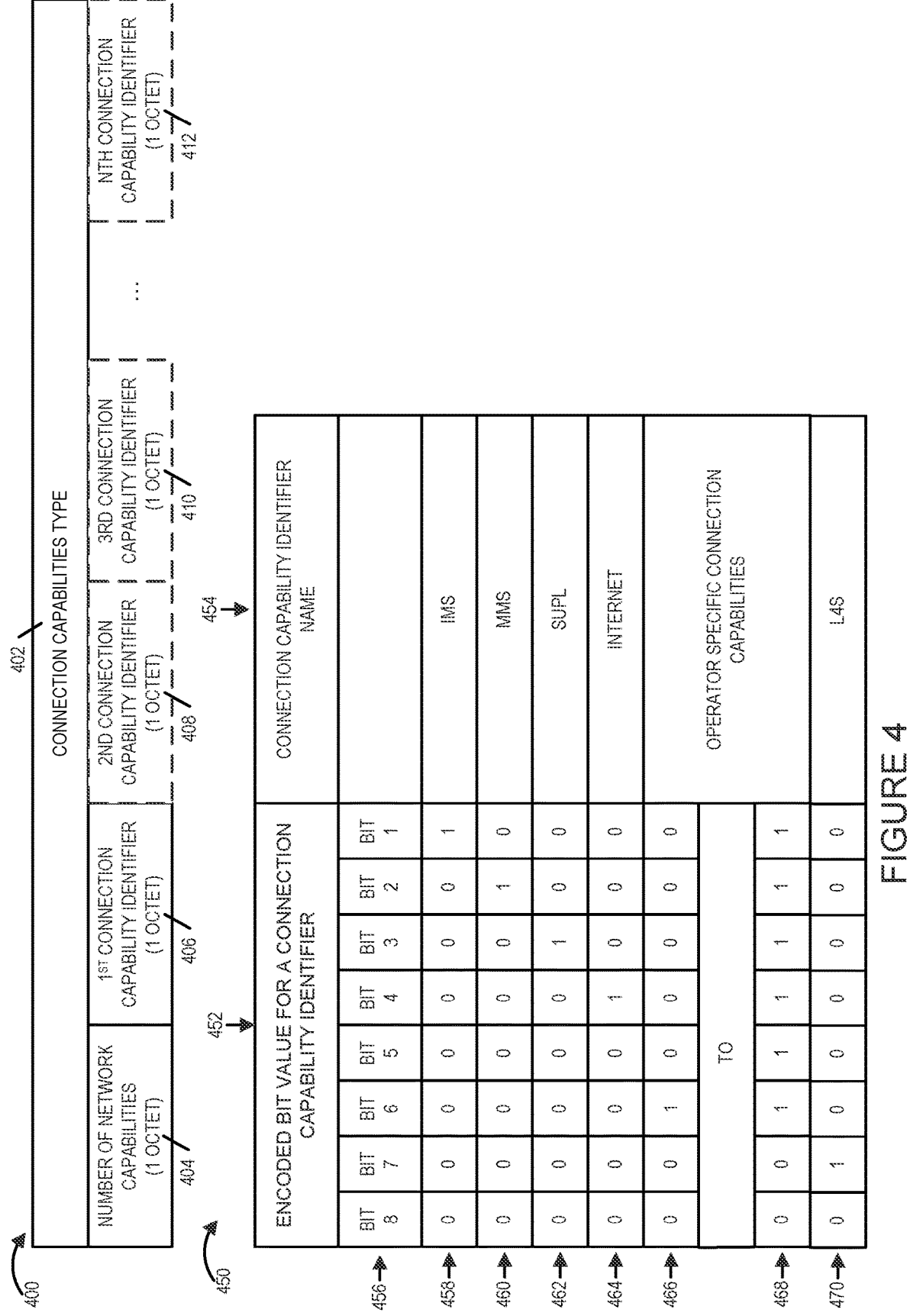
FIG. 4 illustrates exemplary connection capabilities type information and exemplary encoded bit values for each of a plurality of different connection capabilities, in which one of the different connection capabilities is L4S, in accordance with an exemplary embodiment.

FIG. 4 is a drawing 400 illustrates exemplary connection capabilities type information 402 and a table 450 mapping connection capability identifier names to corresponding encoded bit values. Connection capabilities type information 402 includes number of network capabilities information field 404, which is one octet in length, followed by a 1st connection capability identifier field 406, which is one octet in length. Depending upon the value in the number of network capabilities field 404, additional connection capabilities identifier fields (2nd connection capability identifier field 408, 3rd connection capability identifier field 410, . . . , Nth connection capability identifier field 412), each one octet in length, are added and included in connection capabilities type information 402.

Block area 452 of table 450 identifies an encoded bit value for each of a plurality of connection capability identifier names. Column 454 of table 450 includes connection capability identifier names. Row 456 identifies a set of 8 indexed bits used to convey an encoded connection capability identifier. Row 458 indicates that the connection capability identifier named "IMS" (IP Multi-Media Subsystem) is mapped to encoded bit pattern=00000001. Row 460 indicates that the connection capability identifier named "MMS" (Multimedia Messaging Service) is mapped to encoded bit pattern=00000010. Row 462 indicates that the connection capability identifier named "SUPL" (Secure User Plane Location) is mapped to encoded bit pattern=00000100. Row 464 indicates that the connection capability identifier named "INTERNET" is mapped to encoded bit pattern=00001000. Rows 466 and 468 indicate that the encoded bit patterns from 00100000 to 00111111 map to operator specific connection capabilities. Row 470 indicates that the new connection capability identifier named "L4S" (low latency low loss scalable throughput) is mapped to encoded bit pattern=01000000.

In this exemplary embodiment, the new connection capability identifier named L4S has been mapped to encoded bit pattern=01000000 (which was a previously unused bit pattern): however, another one of the currently unused bit patterns, e.g., bit pattern 01000001, for connection capability may alternatively be selected and used in another implementation (e.g., with a different mapping table).

Figure 5:
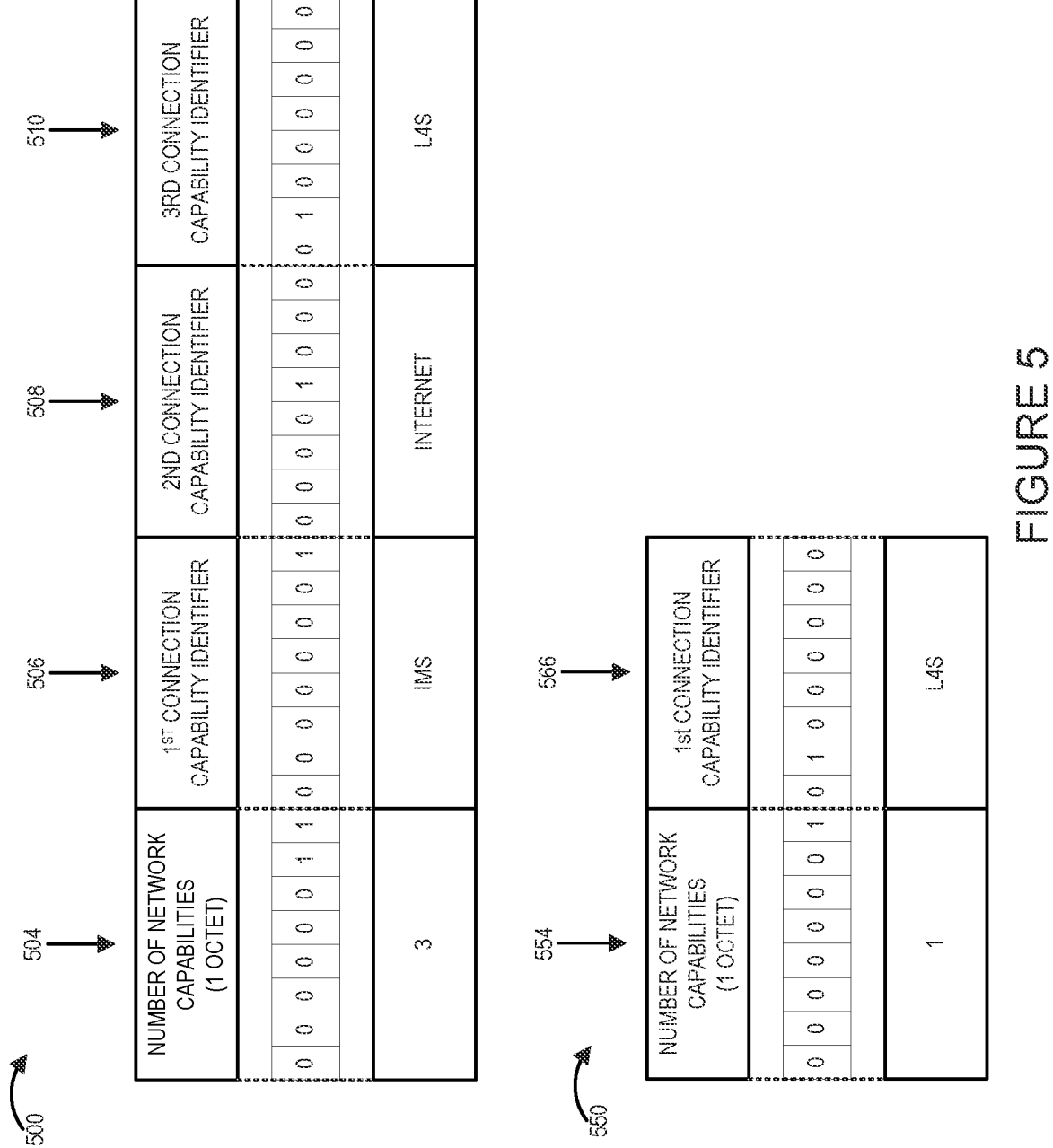
FIG. 5 illustrates examples of connection capabilities type information included in a traffic descriptor, in which one of the identified capabilities is L4S, in accordance with an exemplary embodiment.

FIG. 5 illustrates examples (500, 550) of connection capabilities type information included in a traffic descriptor, in which one of the identified capabilities is L4S, in accordance with an exemplary embodiment. In the first example 500, the number of network capabilities 404 is 3: the 1st connection capability identifier 506 is IMS, which is conveyed by bit pattern 00000001: the 2nd connection capability identifier 508 is INTERNET, which is conveyed by bit pattern 00001000; and the 3rd connection capability identifier 510 is L4S, which is conveyed by bit pattern 01000000. In the second example 550, the number of network capabilities 554 is 1; and the 1st connection capability identifier 556 is L4S, which is conveyed by bit pattern 01000000.

FIG. 6, comprising the combination of FIG. 6A and FIG. 6, is a drawing of a signaling diagram 600, comprising Part A 601 and Part B 603, illustrating an exemplary UE 106: detecting a need to support a new LS4 traffic flow corresponding to an first application (e.g., client APP1 131), using a stored URSP rule including a LS4 traffic descriptor, and associating the new traffic flow with an existing ongoing PDU session, which supports L4S, or triggering the establishment of a new PDU session, which supports L4S, in accordance with an exemplary embodiment.

Signaling diagram 600 illustrates an exemplary communications method which may be implemented by the communications system 100 of FIG. 1 including UE 106, gNB 120, AMF 124, SMF 126, PCF 127, UPF 128 and application servers 118, which include application server 1 119, which supports L4S, applications server 2, which does not support L4S, and application server 3 123, which supports L4S.

UE 106 includes client applications 130. Client applications 130 includes client application 1 131 which supports and uses L4S, client application 2 135 which does not support and use L4S, and client application 3 137, which supports and uses L4S. In some embodiments, client application 1 131 has an API which sends an API message from application 1 to UE 106, said API message including an explicit indication indicating L4S service, as indicated by block 602.

In step 604, application 1 131 on UE 106 sends an application 1 request for an application 1 traffic flow (e.g., APP1 req. LL SF ECT(1)). In some embodiments, an implicit indication of L4S is included in incoming traffic from the first application 131 running on the UE 106 within the IP header, e.g., the IP header ECN field is set to ECT(1) codepoint, which implicitly indicates to UE 106 that L4S is needed to support the incoming application 1 traffic flow.

In step 606, the UE 106 compares traffic (for application 1), which was identified to be an L4S traffic flow based on either the explicit L4S indication of step 602 (via API message) or the implicit L4S indication of step 604 (via IP header ECN field set to ECT(1) in incoming traffic flow from application 1) to URSP traffic descriptor in URSP rules to identify a URSP rule to implement and to determine route selection, e.g., a rule including a L4S descriptor. The UE's URSP traffic descriptor in URSP rule which is identified and implemented includes a L4S traffic descriptor, e.g., a connection capability=L4S.

In step 610, as a result of either the explicit or implicit indication, the UE 106 may bind the traffic to a L4S appropriate route selection as defined in the URSP rule (including the connection capability=L4S). Thus, if possible, the UE 106 associates the traffic for application 1 (which is L4S traffic) with an established PDU session (which supports L4S) and also satisfies any other criteria imposed by the selected URSP rule being implemented by UE 106. For example, application 3 137, which also uses L4S, may have previously established a PDU session supporting L4S, which is currently ongoing, and the new application 1 L4S traffic flow may be associated with that ongoing PDU session supporting L4S. In such a scenario, the UE 106, in step 616 generates and sends a PDU session modification request message 618 to AMF 124, to allow the first application's L4S traffic flow to become part of the ongoing PDU session supporting L4S.

Alternatively, the UE 106 may be unable to associate the new application 1 L4S traffic flow with an existing established ongoing PDU session because: i) there are currently no existing established ongoing PDU sessions which support L4S, or ii) there are existing established ongoing PDU sessions which support L4S, but there are currently no existing established ongoing PDU sessions which support L4S and further meet all the requirements (match all the rule requirements) of the URSP rule that has been identified to be used by UE 106 for route selection. In such cases, in step 614 the UE 106 triggers the establishment of a new PDU session, which supports L4S and satisfies all the criteria of the URSP rule including the L4S traffic descriptor, which is being implemented by UE 106. Thus, in this situation, the UE 106, generates and sends, in step 616, a PDU session establishment request message 618 to AMF 124. in order to establish a new PDU session which supports L4S and meets all the requirements for the first application L4S traffic flow:

PDU session establishment/modification request 618 includes, e.g. PDU session ID 620, requested PDU session type 622, 5GSM capability information 624 including L4S feedback protocol supported indicator information 626, and connection capabilities 628. In step 630 the AMF 124 receives the PDU session establishment request message or the PDU session modification request message (depending upon which type of message is sent), recovers the communicated information and, in response, performs operation as part of the session establishment or session modification procedures.

Step 632 indicates that a new PDU session has been established or an existing on-going PDU session has been modified, in response to request message 618. The following is described for a scenario in which a new PDU session has been established to support the application 1 131 L4S traffic flow to application server 1 119.

There is now a QoS flow with low latency active queue management (LL AQM) (ECN marker), as indicated by block 634. With the QOS flow having been established in step 632 operation proceeds to step 636 in which the UE communicates, as represented by arrows 640, 646 and 652 with the application server 1 119 supporting client application 1 131. Arrow 646 represents the communication of user data with IP header ECN field set to ECT(1) between the base station 120 and UPF 128 which occurs as part of communication steps 642 and 644. Steps 648 and 650 represent the communication of data between the UPF 128 and application server 119 which is represented by arrow 652.

In step 654 congestion is experienced in the uplink (UL) or downlink (DL) used to communicate between the UE 106 and BS 120. DL congestion feedback information is communicated in step 656 along with data packets to the application server 119 via the base station 120 and UPF 128 along with data packets transmitted in the UL. Similarly downlink packets are received in communication step 656 at the UE along with downlink congestion feedback information. Steps 656, 658, 662, 664, 668 and 670 represent communications steps in which data packets with congestion information are received and/or transmitted at the device to which the specific step corresponds. Between base station 120 and the UPF 128 user data is communicated as packets with the packets having an IP Header ECN filed set to CE and with the latest feedback congestion information being indicated with the transmitted packet to the destination device to which the packet is directed. Step 674 represents the receipt of uplink congestion feedback information, e.g., L4S feedback information corresponding to application 1 131 being received by the UE while step 676 represents the application server 1 119 receiving downlink congestion feedback information, e.g., APP1 L4S feedback information, sent by the UE 106 with regard to application 1 data communication.

Steps 678, 680, 684, 686, 690, 692 represent the communication of additional user data with congestion feedback information being communicated between the devices corresponding to the steps (e.g., above the numbered step represented by the numbered dot) with arrows 682, 688 and 694 representing the communication between the devices. As a result of the communication represented by the arrows 682, 688, 694 updated uplink and downlink congestion information is communicated between the various devices with the UE receiving updated uplink congestion feedback information in step 678 and the application server 119 receiving updated downlink congestion feedback information relating to application 1 in step 692.

Based on the updated uplink congestion feedback information the UE 106 in step 696 performs uplink rate adaption, e.g., adjusts encoding and/or other transmission parameters to decrease the uplink data rate corresponding to application 1 131 in response to receiving updated uplink feedback information indicating an increase in uplink congestion or increases the uplink data rate in response to receiving updated uplink feedback information indicating a decrease in uplink congestion with regard to application 1 131.

Similarly in step 698 the application server 1 119 performs downlink rate adaption, e.g., adjusts encoding and/or other transmission parameters to decrease the downlink data rate corresponding to application 1 131 in response to receiving updated downlink feedback information indicating an increase in downlink congestion or to increase the downlink data rate in response to receiving updated downlink feedback information indicating a decrease in downlink congestion with respect to application 1 131 data transmissions.

In steps 700, 702, 706, 708, 712 and 714 the communication of application 1 data transmissions continues with the corresponding devices receiving and/or sending application 1 data along with updated congestion feedback information as represented by bi-direction arrows 704, 710, 716.

Step 718 indicates that no congestion is detected by the base station 120 in the uplink or downlink indicating that the rate adaption performed in steps 696 and 698 was successful and that no additional rate adaptation is required until a change in congestion is detected.

FIG. 7, comprising the combination of FIG. 7A and FIG. 7B is a flowchart 800 of an exemplary method of operating a UE to support L4S traffic flows in accordance with an exemplary embodiment. The UE implementing the exemplary method of flowchart 800 is, e.g., UE 106 of system 100 of FIG. 1. Operation of the exemplary method starts in step 802 and proceeds to step 804 or step 806, depending upon the exemplary embodiment. In step 804 the UE stores in the UE (in its memory) a set of UE route selection policy (URSP) rules, said set of URSP rules including at least a first rule including a L4S traffic descriptor. For example, the first rule includes a traffic descriptor which includes a connection capability identifier indicating "L4S".

In some embodiments, the L4S traffic descriptor is included in the first rule in the form of a traffic descriptor component value corresponding to L4S, said L4S traffic descriptor being included in a traffic descriptor component value field of a connection capability type field which lists multiple different traffic descriptor component values.

In some embodiments, the set of URSP rules also includes rules for non-L4S flows, rules for non-L4S flows not including said L4S traffic type descriptor. In some embodiments, said set of URSP rules includes a plurality of URSP rules including a L4S traffic descriptor and a plurality of rules which do not include a L4S traffic descriptor.

In some embodiments, the storing of step 804 is part of a UE initialization process (e.g., factory preload or service provider operator initial load) in which an initial set of URSP rules are downloaded and stored in the UE, said initial set of URSP rules including at least a first rule including a L4S traffic descriptor. In some embodiments, the storing of step 804 is part of a UE reconfiguration process in which a replacement set of URSP rules are downloaded and stored in the UE, said replacement set of URSP rules including at least a first rule including a L4S traffic descriptor.

Alternatively, operation proceeds from start step 802 to step 806. In step 806 the UE stores in the UE (in its memory) an initial set of UE route selection policy (URSP) rules, e.g., a set of route selection rules which do not include a L4S traffic descriptor. Operation proceeds from step 806 to step 808. In step 808 the UE receives at the UE, enhanced URSP rules including a first rule including a L4S traffic descriptor, said enhanced rules including said first rule being from a policy control function (PCF) (e.g., PCF 127) and being communicated to the UE via an access and mobility management function (AMF) (e.g., AMF 124), as part of a UE policy update. Operation proceeds from step 808 to step 810. In step 810 the UE stores in the UE (in its memory) the enhanced URSP rules including the first rule (e.g., with some rules from the initial set of UE route selection rules) to form a set of UE route selection rules.

Operation proceeds from step 804 or step 810 to step 812. In step 812 the UE detects a need to support a first L4S traffic flow (e.g., client application 1 131 traffic flow) by detecting: i) an application request (e.g., an API message generated by an application, e.g., a first application running on the UE (e.g., a local application) requesting L4S treatment for application traffic corresponding to the requesting application or ii) a L4S indicator in incoming application traffic (e.g., in an IP header of an incoming application traffic packet). Step 812 includes step 814 or step 816, e.g., depending upon the implemented embodiment. In step 814 the UE detects an AP message generated by a first application (e.g., APP 1 131) running on the UE, said API message including an explicit indication of L4S service. In step 816 the UE detects an implicit L4S indicator in incoming traffic from a first application (e.g., APP 1 131) running on UE. The implicit indication is, e.g., IP header Explicit Congestion Notification (ECN) field set to ECT(1) codepoint. Operation proceeds from step 812, via connecting node A 818, to step 820.

In step 820 the UE determines the URSP rule stored in the UE to use in response to detect the need to support an L4S traffic flow: Step 820 includes step 822 and/or step 823, e.g., depending upon the particular embodiment. In step 822 the UE identifies a stored URSP rule that includes an L4S traffic descriptor. In step 823 the UE identifies a stored URSP rule that includes an L4S traffic descriptor. And which also includes one or more descriptors indicating that additional requirements of the l4S traffic flow to be supported are also satisfied by the URSP rule. Operation proceeds from step 822 to step 824.

In step 824 the UE determines if a PDU session (e.g., a PDU session which supports L4S and any other requirements of the first application packet flow) corresponding to the determined URSP rule (of step 820) is already ongoing. For example, a PDU session corresponding to a client application 3 137 L4S traffic flow may have been previously established, and is currently ongoing, and that established PDU session, which supports L4S, satisfies the determined URSP policy rule (for the new L4S application 1 traffic flow) of step 820. Alternatively, there may not be an ongoing PDU session that corresponds to the determined URSP policy rule of step 820, e.g., because there are not any ongoing PDU session supporting L4S or because an ongoing PDU session which supports L4S does not satisfy (meet) all the criteria of the determined URSP policy rule (for new L4S application 1 traffic flow) of step 820. Operation proceeds from step 824 to step 826.

In step 826 if the determination is that a PDU session corresponding to the determined URSP policy rule is already ongoing (as indicated by Y 824), then operation proceeds from step 826 to step 832. In step 832 the UE assigns the first application packet flow to an on-going PDU session that supports L4S. Step 832 includes step 834 and step 836. In step 834 the UE generates a PDU session modification request. Operation proceeds from step 834 to step 836. In step 836 the UE sends the PDU session modification request to an AMF, e.g., AMF 124.

Alternatively, in step 826 if the determination is that a PDU session corresponding to the determined URSP policy rule is already ongoing (as indicated by N 830), then operation proceeds from step 826 to step 838. In step 838 the UE establishes a new PDU session supporting an L4S packet flow and assigns the first application packet flow to the new PDU session. Step 838 includes step 840 and step 842. In step 840 the UE generates a PDU session establishment request. Operation proceeds from step 840 to step 842, in which the UE sends the generated PDU session establishment request to an AMF, e.g., AMF 124, to establish the new PDU session supporting the L4S packet flow:

FIG. 8 is a drawing of an exemplary user equipment (UE) 900 in accordance with an exemplary embodiment. Exemplary UE 900 is, e.g., any of the UEs (106, 108, 110, 112) of system 100 of FIG. 1, a UE implementing steps of method of the signaling diagrams (200, 600) of FIG. 2 and/or FIG. 6, and/or a UE implementing steps of the flowchart 800 of FIG. 7. UE 900 includes processor 902, e.g., a CPU, a wireless interfaces 904, network interface 906, I/O interface 908, Subscriber Identity module (SIM) card 909, GPS receiver 910, memory 912 and assembly of hardware components 914, e.g., an assembly of circuits, coupled together via bus 916 over which the various elements may exchange data and information.

Wireless interfaces 904 includes a plurality of wireless interfaces (1st wireless interface 922, . . . , Nth wireless interface 936). 1st wireless interface 922 includes wireless receiver (RX) 924 and wireless transmitter (TX) 926. Wireless receiver 924 is coupled to one or more receive antennas or antenna elements (928, . . . , 930) via which the UE 900 receives wireless signals, e.g., from a radio access network node, e.g., a gNB base station. Wireless transmitter 926 is coupled to one or more transmit antennas or antenna elements (932, . . . , 934) via which the UE 900 transmits wireless signals, e.g., to a radio access network node, e.g., a gNB base station. In some embodiments, the same antennas are used for transmit and receive with regard to the 1st wireless interface 922. Nth wireless interface 936 includes wireless receiver (RX) 938 and wireless transmitter (TX) 940. Wireless receiver 938 is coupled to one or more receive antennas or antenna elements (942, . . . , 944) via which the UE 900 receives wireless signals, e.g., from a radio access network node, e.g., a gNB base station. Wireless transmitter 940 is coupled to one or more transmit antennas or antenna elements (946, . . . , 948) via which the UE 900 transmits wireless signals, e.g., to a radio access network node, e.g., a gNB base station. In some embodiments, the same antennas are used for transmit and receive with regard to the 2nd wireless interface 936. In some embodiments the 1st wireless interface 922 and the nth wireless interface 936 are used for different communications bands and/or correspond to different technologies.

Network interface 906, e.g., a wired or optical interface, includes receiver 918, transmitter 920 and connector 921. Network interface 906 allows the UE 900 to connect to a wired or optical interface, when the UE 900 is stationary and the wired or optical interface is available.

GPS receiver 910 is coupled to GPS antenna 911 via which the UE 900 receives GPS signals used to determine UE position and velocity. UE 900 further includes a plurality of I/O devices (microphone 956, speaker 958, camera 960, display 962, e.g., a touch screen display, switches 964, keypad 966, and mouse 968) coupled to I/O interface 908 via which the via I/O devices may interact with other elements within UE 900.

Memory 912 includes a control routine 970, an assembly of components 972, e.g., an assembly of software components, a plurality of client applications (client app 1 974, . . . , client app N 976), and data/information 978. Control routine 970 includes instructions which when executed by processor 902 control the UE 900 to implement basic operational functions, e.g., read memory, write to memory, control an interface, load a program, subroutine, or app, etc. Assembly of components 972, e.g., an assembly of software components, e.g., routines, subroutines, applications, etc., includes, e.g., code which when executed by processor 902, controls the UE 900 to implement steps of a method, e.g., steps of the method of signaling diagram 200 of FIG. 2 which are performed by a UE, steps of the method of signaling diagram 600 of FIG. 6 which are performed by a UE, and/or steps of the exemplary method of flowchart 800 of FIG. 7.

Different applications may, and sometimes do, have different requirements with regard to latency, etc. For example some applications require classic SF ECT(0) and some applications require LL SF ECT(1).

Data/information 978 includes received UE policy update information 982 (e.g., new URSP rules including a first rule including a L4S traffic descriptor), a stored set of URSP rules 984 including a first rule 984 including L4S traffic descriptor, a received API message 988, which was generated by a first application, e.g., client APP 1 974, said message including an explicit L4S indicator, and received traffic 990 from a first application on the UE, e.g., client APP 1 974, said received traffic from the first application including an implicit L4S indicator in IP header of an incoming application traffic packet, e.g., ECN field set to ECT(1) codepoint. Data/information 980 further includes a determined URSP rule to use 990, e.g., a URSP rule including a L4S traffic descriptor, information 992 pertaining to ongoing PDU sessions, e.g., used to identify if any ongoing session support L4S and satisfy the requirements for the a new L4S traffic flow for application 1, a determination 994 if an existing PDU session can be modified to support the first application L4S traffic or if a new PDU session needs to be established to support the first APP L4S traffic, and a generated PDU session establishment request message or a generated PDU session modification request message.

FIG. 9 is a drawing of an exemplary policy control function (PCF) device 1000 in accordance with an exemplary embodiment. PCF device 1000 is, e.g., PCF 127 of system 100 of FIG. 1 and FIG. 2. PCF device 1000 includes a processor 1002, e.g., a CPU, a network interface 1004, e.g., a wired or optical interface, an assembly of hardware components 1012, e.g., an assembly of circuits, and memory 1010, coupled together via a bus 1014 over which the various elements may interchange data and information.

Network interface 1004, e.g., a wired or optical interface, include a receiver 1006, a transmitter 1008 and a connector 1009. Memory 1010 includes a control routine 1016, an assembly of components 1018, e.g., an assembly of software components, and data/information 1020. Control routine 1016 includes instructions which when executed by processor 1002 control the PCF device 1000 to implement basic operational functions, e.g., read memory, write to memory, control an interface, load a program, subroutine, or app, etc. Assembly of components 1018, e.g., an assembly of software components, e.g., routines, subroutines, applications, etc., includes, e.g., code which when executed by processor 1002, controls the PCF device 1000 to implement steps of a method, e.g., steps of the method of signaling diagram 200 of FIG. 2 which are performed by a PCF, steps and/or operations shown or described with respect to FIG. 6 which are performed by a PCF, and/or steps or operations shown or described with respect to the exemplary method of flowchart 800 of FIG. 7.

Data information 1020 includes a determination 1022 to update a UE to enhance URSP rules with a new "L4S" connections capability, enhanced URSP rules 1024 including a traffic descriptor which includes a connection capability identifier indicating a new "L4S" connections capability, and a message 1026 communicating the enhanced URSP rules including a traffic descriptor which includes a connection capability identifier indicating a new "L4S" connections capability to be sent to an AMF to deliver to a UE.

FIG. 10 is a drawing of an exemplary access and mobility management function (AMF) device 1100 in accordance with an exemplary embodiment. AMF device 1100 is, e.g., AMF 124 of system 100 of FIG. 1, FIG. 2 and FIG. 6. AMF device 1100 includes a processor 1102, e.g., a CPU, a network interface 1104, e.g., a wired or optical interface, an assembly of hardware components 1112, e.g., an assembly of circuits, and memory 1110, coupled together via a bus 1114 over which the various elements may interchange data and information.

Network interface 1104, e.g., a wired or optical interface, includes a receiver 1106, a transmitter 1108 and a connector 1109. Memory 1010 includes a control routine 1116, an assembly of components 1118, e.g., an assembly of software components, and data/information 1120. Control routine 1116 includes instructions which when executed by processor 1002 control the AMF device 1100 to implement basic operational functions, e.g., read memory, write to memory, control an interface, load a program, subroutine, or app, etc. Assembly of components 1118, e.g., an assembly of software components, e.g., routines, subroutines, applications, etc., includes, e.g., code which when executed by processor 1102, controls the AMF device 1100 to implement steps of a method, e.g., steps of the method of signaling diagram 200 of FIG. 2 which are performed by an AMF, steps and/or operations shown or described with respect to FIG. 6 which are performed by an AMF, and/or steps or operations shown or described with respect to the exemplary method of flowchart 800 of FIG. 7 which are performed by an AMF.

Data information 1120 includes a received message 1122 from PCF communicating enhanced URSP rules including a traffic descriptor which includes a connection capability identifier indicating a new "L4S" connections capability, said received message to be send to a UE. Data/information 1120 further includes a generated message 1124 forwarding received enhanced URSP rules including a traffic descriptor which includes a connection capability identifier indicating a new "L4S" connections capability, said generated message to be sent to a UE.

FIG. 11 is a drawing of an exemplary access network node 1200, e.g., a base station, such as e.g., a gNB, a WiFi access point, or a cable network device, in accordance with an exemplary embodiment. Exemplary access network node 1200 is, e.g., base station 120, e.g., a gNB, of system 100 of FIG. 1. Access network node 1200 includes a processor 1202, e.g., a CPU, a wireless interface 1204, a network interface 1206, e.g., a wired or optical interface, an assembly of hardware components 1208, e.g., an assembly of circuits, and memory 1210 coupled together via a bus 1211 over which the various elements may interchange data and information. Network interface 1206, e.g., a wired or optical interface includes a receiver 1216 a transmitter 1218 and a connector 1219. Network interface 1206 couples the access network node 1200 to network nodes, e.g., core network nodes including, e.g., AMF, PCF, SMF, UPFs, other access network nodes, e.g., other base stations, and/or the Internet. Wireless interface 1204 includes a wireless receiver 1212 coupled to one or more receive antennas or antenna elements (1220, . . . , 1222) via which the access network node 1200 receives uplink wireless signals from UEs. Wireless interface 1204 further includes a wireless transmitter 1214 coupled to one or more transmit antennas or antenna elements (1224, . . . , 1226) via which the access network node 1200 transmits downlink signals to UEs. In some embodiments, the same antennas are used for transmit and receive. In some embodiments, the wireless receiver 1212 and the wireless transmitter 1214 are included as part of a wireless transceiver 1205.

Memory 1210 includes a control routine 1228, an assembly of components 1230, e.g., an assembly software components, and data/information 1232. Control routine 1228 includes instructions which when executed by processor 1202 control the access network node 1200 to implement basic operational functions, e.g., read memory, write to memory, control an interface, load a program, subroutine, or app, etc. Assembly of components 1230, e.g., an assembly of software components, e.g., routines, subroutines, applications, etc., includes, e.g., code which when executed by processor 1202, controls the access network node 1200 to implement steps of a method, e.g., steps and/or operations shown or described with respect to method of signaling diagram 200 of FIG. 2 which are performed by an access network node, steps and/or operations shown or described with respect to FIG. 6 which are performed by an access network node, and/or steps or operations shown or described with respect to the exemplary method of flowchart 800 of FIG. 7 which are performed by an access network node.

Data/information includes, e.g., messages being sent to a UE communicating enhanced URSP rules, said rules including a rule including a L4S connection capability indicator, a received PDU session establishment message from a UE to be conveyed to a 5G core, said PDU session establishment message for establishing a new PDU session supporting L4S, e.g., to convey application 1 data, a received PDU session modification message from a UE to be conveyed to a 5G core, said PDU session modification message for modifying an ongoing PDU session supporting L4S, e.g., to convey an application 1 L4S traffic flow in addition to conveying another application, e.g. application 3 L4S traffic flow:

NUMBERED LIST OF EXEMPLARY METHOD EMBODIMENTS

Method Embodiment 1. A method of operating User Equipment (UE), the method comprising: storing (804 or 810) in the UE (e.g., in memory) a set of UE Route Selection Policy (URSP) rules, said set of URSP rules including at least a first rule including a L4S traffic descriptor (e.g. the first rule including a traffic descriptor which includes a connection capability identifier indicating "L4S"): detecting (812) a need to support a L4S traffic flow by detecting i) an application request (e.g., an API message generated by an application, e.g., a first application, running on the UE (e.g., a local application)) requesting L4S treatment for application traffic corresponding to the requesting application or ii) an L4S indicator in incoming application traffic (e.g., in an IP header of an incoming application traffic packet); and determining (820) the URSP rule stored in the UE to use in response to detecting the need to support the L4S traffic flow; said determining (820) including identifying (822) a stored URSP rule that includes an L4S traffic descriptor.

Method Embodiment 1A. The method of Method Embodiment 1, wherein said L4S traffic descriptor is included in the first rule in the form of a traffic descriptor component value corresponding to L4S, said L4S traffic descriptor being included in a traffic descriptor component value field of a connection capabilities type field which lists multiple different traffic descriptor component values.

Method Embodiment 2. The method of Method Embodiment 1, wherein determining (820) the URSP rule includes identifying (823) a URSP rule, which includes a L4S traffic type descriptor, and which also includes one or more descriptors indicating that additional requirements of the L4S traffic flow to be supported are also satisfied by the URSP rule.

Method Embodiment 3. The method of Method Embodiment 1, wherein said set of URSP rules also include rules for non L4S flows, rules for non-L4S flows not including said L4S traffic type descriptor.

Method Embodiment 4. The method of Method Embodiment 3, further comprising: determining (824) if a PDU session (e.g., a PDU session which supports L4S and any other requirements of the first application packet flow) corresponding to the determined URSP rule is already ongoing.

Method Embodiment 5. The method of Method Embodiment 4, further comprising: in response to determining that (828) a PDU session corresponding to the determined URSP rule is already ongoing, assigning (832) the first application packet flow to an on-going PDU session that supports L4S.

Method Embodiment 6. The method of Method Embodiment 5, wherein assigning (832) the first application packet flow to an on-going PDU session that supports L4S includes: sending (836) a PDU session modification request to an AMF.

Method Embodiment 7. The method of Method Embodiment 5, further comprising: in response to determining that (830) a PDU session corresponding to the determined URSP policy is not already ongoing, establishing (838) a new PDU session supporting an L4S packet flow and assigning the first application packet flow to the new PDU session.

Method Embodiment 8. The method of Method Embodiment 7, wherein establishing (838) a new PDU session supporting an L4S packet flow includes: sending (842) a PDU session establishment request to an AMF to establish the new PDU session supporting the L4S packet flow.

Method Embodiment 9. The method of Method Embodiment 1, further comprising: receiving (808) the first rule at the UE, prior to storing the first rule at the UE, said first rule being from a PCF and being communicated to the UE via an AMF as part of a UE policy update.

Method Embodiment 10. The method of Method Embodiment 9, wherein said set of URSP rules includes a plurality of URSP rules including a L4S traffic descriptor and a plurality of rules which do not include a L4S traffic descriptor.

Method Embodiment 11. A method of operating a policy control function (PCF) apparatus, the method comprising: generating (205) a UE Route Selection Policy (URSP) rule which includes a connection capability identifier indicating a L4S connections capability; and communicating (210) the URSP rule indicating a L4S connections capability to a user equipment device.

Method Embodiment 12. The method of Method Embodiment 11, wherein communicating (210) the URSP rule indicating the L4S connections capability to a user equipment device includes: sending (210) the URSP rule to the UE via an Access and Mobility Management Function (AMF) as part of a URSP update, said URSP rule including a traffic descriptor which includes the connection capability identifier indicating the L4S connections capability.

NUMBERED LIST OF EXEMPLARY APPARATUS EMBODIMENTS

Apparatus Embodiment 1. A User Equipment (UE) (106 or 900), comprising: memory (912) storing a set of UE Route Selection Policy (URSP) rules, said set of URSP rules including at least a first rule including a L4S traffic descriptor (e.g. the first rule including a traffic descriptor which includes a connection capability identifier indicating "L4S"); and a processor (902) configured to: operate the UE to detect (812) a need to support a L4S traffic flow by detecting i) an application request (e.g., an API message generated by an application, e.g., a first application, running on the UE (e.g., a local application)) requesting L4S treatment for application traffic corresponding to the requesting application or ii) an L4S indicator in incoming application traffic (e.g., in an IP header of an incoming application traffic packet); and determine (820) the URSP rule stored in the UE to use in response to detecting the need to support the L4S traffic flow; said determining (820) including identifying (822) a stored URSP rule that includes an L4S traffic descriptor.

Apparatus Embodiment 1A. The UE of Apparatus Embodiment 1, wherein said L4S traffic descriptor is included in the first rule in the form of a traffic descriptor component value corresponding to L4S, said L4S traffic descriptor being included in a traffic descriptor component value field of a connection capabilities type field which lists multiple different traffic descriptor component values.

Apparatus Embodiment 2. The UE of Apparatus Embodiment 1, wherein said processor (902) is configured to: identify (823) a URSP rule which includes a L4S traffic type descriptor, and which also includes one or more descriptors indicating that additional requirements of the L4S traffic flow to be supported are also satisfied by the URSP rule, as part of being configured to determine (820) the URSP rule.

Apparatus Embodiment 3. The UE of Apparatus Embodiment 1, wherein said set of URSP rules also include rules for non L4S flows, rules for non-L4S flows not including said L4S traffic type descriptor.

Apparatus Embodiment 4. The UE of Apparatus Embodiment 3, wherein said processor (902) is further configured to: determine (824) if a PDU session (e.g., a PDU session which supports L4S and any other requirements of the first application packet flow) corresponding to the determined URSP rule is already ongoing.

Apparatus Embodiment 5. The UE of Apparatus Embodiment 4, wherein said processor (902) is further configured to: operate the UE to assign (832) the first application packet flow to an on-going PDU session that supports L4S, in response to determining that (828) a PDU session corresponding to the determined URSP rule is already ongoing.

Apparatus Embodiment 6. The UE of Apparatus Embodiment 5, said processor (902) is configured to: operate the UE to send (836) (e.g., via transmitter 926) a PDU session modification request to an AMF, as part of being configured to operate the UE to assign (832) the first application packet flow to an on-going PDU session that supports L4S.

Apparatus Embodiment 7. The UE of Apparatus Embodiment 5, wherein said processor (902) is further configured to: operate the UE to establish (838) a new PDU session supporting an L4S packet flow and assigning the first application packet flow to the new PDU session, in response to determining that (830) a PDU session corresponding to the determined URSP policy is not already ongoing.

Apparatus Embodiment 8. The UE of Apparatus Embodiment 7, wherein said processor (902) is configured to operate the UE to send (842) (e.g., via wireless transmitter 926) a PDU session establishment request to an AMF to establish the new PDU session supporting the L4S packet flow, as part of being configured to operate the UE to establish (838) a new PDU session supporting an L4S packet flow.

Apparatus Embodiment 9. The UE of Apparatus Embodiment 1, wherein said processor (902) is further configured to: operate the UE to receive (808) (e.g., wireless receiver 924) the first rule at the UE, prior to storing the first rule at the UE, said first rule being from a PCF (127) and being communicated to the UE via an AMF (124) as part of a UE policy update.

Apparatus Embodiment 10. The UE of Apparatus Embodiment 9, wherein said set of URSP rules includes a plurality of URSP rules including a L4S traffic descriptor and a plurality of rules which do not include a L4S traffic descriptor.

Apparatus Embodiment 11. A policy control function (PCF) apparatus (127 or 1000), the method comprising: memory (1012); and a processor (1002) configured to: generate (205) a UE Route Selection Policy (URSP) rule which includes a connection capability identifier indicating a L4S connections capability; and communicate (210) (e.g., transmit using transmitter 1008) the URSP rule indicating a L4S connections capability to a user equipment (UE) (106 or 900).

Apparatus Embodiment 12. The PCF apparatus (127 or 1000) of Apparatus Embodiment 11, wherein communicating (210) the URSP rule indicating the L4S connections capability to a UE (106 or 900) includes: sending (210) the URSP rule to the UE (106 or 900) via an Access and Mobility Management Function (AMF) (124) as part of a URSP update, said URSP rule including a traffic descriptor which includes the connection capability identifier indicating the L4S connections capability.

NUMBERED LIST OF EXEMPLARY NON-TRANSITORY COMPUTER READABLE MEDIUM EMBODIMENTS

Non-Transitory Computer Readable Medium Embodiment 1. A non-transitory computer readable medium (912) including machine executable instructions, which when executed by a processor (902) of a user equipment (UE) (106 or 900) control the UE to perform the steps of: storing (804 or 810) in the UE (e.g., in memory) a set of UE Route Selection Policy (URSP) rules, said set of URSP rules including at least a first rule including a L4S traffic descriptor (e.g., the first rule including a traffic descriptor which includes a connection capability identifier indicating "L4S"): detecting (812) a need to support a L4S traffic flow by detecting i) an application request (e.g., an API message generated by an application, e.g., a first application, running on the UE (e.g., a local application)) requesting L4S treatment for application traffic corresponding to the requesting application or ii) an L4S indicator in incoming application traffic (e.g., in an IP header of an incoming application traffic packet); and determining (820) the URSP rule stored in the UE to use in response to detecting the need to support the L4S traffic flow; said determining (820) including identifying (822) a stored URSP rule that includes an L4S traffic descriptor.

Non-Transitory Computer Readable Medium Embodiment 2. A non-transitory computer readable medium (1012) including machine executable instructions, which when executed by a processor (1002) of a Policy Control Function (PCF) apparatus (127 or 1000) control the PCF apparatus to perform the steps of: generating (205) a UE Route Selection Policy (URSP) rule which includes a connection capability identifier indicating a L4S connections capability; and communicating (210) the URSP rule indicating a L4S connections capability to a user equipment device.

The techniques of various embodiments may be implemented using software, hardware and/or a combination of software and hardware. Various embodiments are directed to apparatus, e.g., user equipment (UE) devices, core network devices (e.g., PCF devices, AMF devices, SMF devices, UPF devices, etc.), access network devices (e.g., base stations, WiFi access nodes, cable network access devices), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to methods, e.g., method of controlling and/or operating user equipment (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of each of the described methods.

In various embodiments each of the steps or elements of a method are implemented using one or more processors. In some embodiments, each of elements or steps are implemented using hardware circuitry.

In various embodiments devices, e.g., user equipment (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements described herein are implemented using one or more components to perform the steps corresponding to one or more methods, for example, provisioning user equipment devices, provisioning AP devices, provisioning AAA servers, provisioning orchestration servers, generating messages, message reception, message transmission, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., user (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, are configured to perform the steps of the methods described as being performed by the user equipment devices, wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., a user equipment (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, with a processor which includes a component corresponding to each of the steps of the various described methods performed by the device in which the processor is included. In some but not all embodiments a device, e.g., user equipment (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., user (UE) devices, core network devices (e.g., PCF devices, AMF devices, SMF devices, UPF devices, etc.), wireless devices, mobile devices, smartphones, subscriber devices, desktop computers, printers, IPTV, laptops, tablets, network edge devices, Access Points, wireless routers, switches, WLAN controllers, orchestration servers, orchestrators, Gateways, AAA servers, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a user equipment (UE) device, core network device (e.g., PCF device, AMF device, SMF device, UPF device, etc.), wireless device, mobile device, smartphone, subscriber device, desktop computer, printer, IPTV, laptop, tablets, network edge device, Access Point, wireless router, switch, WLAN controller, orchestration server, orchestrator, Gateway, AAA server, server, node and/or element or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating User Equipment (UE), the method comprising:

storing in the UE a set of UE Route Selection Policy (URSP) rules, said set of URSP rules including at least a first rule including a L4S traffic descriptor;

detecting, in the UE, a need to support a L4S traffic flow by detecting i) an application request from an application running on the UE requesting L4S treatment for application traffic corresponding to the requesting application or ii) an L4S indicator in incoming application traffic, said incoming application traffic being from an application running on the UE; and determining, in the UE, the URSP rule stored in the UE to use in response to detecting the need to support the L4S traffic flow, said determining including identifying a stored URSP rule that includes an L4S traffic descriptor.

2. The method of claim 1, wherein detecting a need to support a LAS traffic flow includes detecting an application request from an application running on the UE requesting L4S treatment for application traffic corresponding to the requesting application.

3. The method of claim 1, wherein detecting a need to support a LAS traffic flow includes detecting an L4S indicator in incoming application traffic, said incoming application traffic being from an application running on the UE.

4. The method of claim 1, wherein said set of URSP rules also include rules for non LAS flows, rules for non-L4S flows not including said L4S traffic type descriptor.

5. The method of claim 4, further comprising:

determining if a PDU session corresponding to the determined URSP rule is already ongoing.

6. The method of claim 5, further comprising:

in response to determining that a PDU session corresponding to the determined URSP rule is already ongoing, assigning a first application packet flow to an on-going PDU session that supports L4S.

7. The method of claim 6, wherein assigning the first application packet flow to an on-going PDU session that supports L4S includes:

sending a PDU session modification request to an AMF.

8. The method of claim 6, further comprising:

in response to determining that a PDU session corresponding to the determined URSP policy is not already ongoing, establishing a new PDU session supporting an L4S packet flow and assigning the first application packet flow to the new PDU session.

9. The method of claim 8, wherein establishing a new PDU session supporting an LAS packet flow includes:

sending a PDU session establishment request to an AMF to establish the new PDU session supporting the L4S packet flow.

10. The method of claim 1, further comprising:

receiving the first rule at the UE, prior to storing the first rule at the UE, said first rule being from a PCF and being communicated to the UE via an AMF as part of a UE policy update.

11. The method of claim 10, wherein said set of URSP rules includes a plurality of URSP rules including a L4S traffic descriptor and a plurality of rules which do not include a L4S traffic descriptor.

12. A User Equipment (UE), comprising:

memory storing a set of UE Route Selection Policy (URSP) rules, said set of URSP rules including at least a first rule including a LAS traffic descriptor; and a processor configured to:

operate the UE to detect a need to support a LAS traffic flow by detecting i) an application request from an application running on the UE requesting L4S treatment for application traffic corresponding to the requesting application or ii) an LAS indicator in incoming application traffic, said incoming application traffic being from an application running on the UE; and determine the URSP rule stored in the UE to use in response to detecting the need to support the L4S traffic flow, said determining including identifying a stored URSP rule that includes an L4S traffic descriptor.

13. The UE of claim 12, wherein said processor is configured, as part of being configured operate the UE to detect a need to support a L4S traffic flow, to:

detect an application request from an application running on the UE requesting LAS treatment for application traffic corresponding to the requesting application.

14. The UE of claim 12, wherein said processor is further configured, as part of being configured operate the UE to detect a need to support a L4S traffic flow, to:

detect an L4S indicator in incoming application traffic, said incoming application traffic being from an application running on the UE.

15. The UE of claim 14, wherein said processor is further configured to:

operate the UE to assign a first application packet flow to an on-going PDU session that supports L4S, in response to determining that a PDU session corresponding to the determined URSP rule is already ongoing.

16. The UE of claim 15, said processor is configured to:

operate the UE to send a PDU session modification request to an AMF, as part of being configured to operate the UE to assign the first application packet flow to an on-going PDU session that supports L4S.

17. The UE of claim 15, wherein said processor is further configured to:

operate the UE to establish a new PDU session supporting an LAS packet flow and assigning the first application packet flow to the new PDU session, in response to determining that a PDU session corresponding to the determined URSP policy is not already ongoing.

18. The UE of claim 17, wherein said processor is configured to:

operate the UE to send a PDU session establishment request to an AMF to establish the new PDU session supporting the L4S packet flow, as part of being configured to operate the UE to establish a new PDU session supporting an LAS packet flow.

19. A method of operating a policy control function (PCF) apparatus, the method comprising:

generating a UE Route Selection Policy (URSP) rule which includes a connection capability identifier indicating a LAS connections capability; and communicating the URSP rule indicating a LAS connections capability to a user equipment (UE).

20. The method of claim 19, wherein communicating the URSP rule indicating the L4S connections capability to a UE includes:

sending the URSP rule to the UE via an Access and Mobility Management Function (AMF) as part of a URSP update, said URSP rule including a traffic descriptor which includes the connection capability identifier indicating the L4S connections capability.

\*   \*   \*   \*   \*